US008564714B2

(12) United States Patent
Umeyama

(10) Patent No.: US 8,564,714 B2
(45) Date of Patent: Oct. 22, 2013

(54) ELECTRONIC CAMERA THAT WIRELESSLY TRANSFERS DATA, WHICH INCLUDES A POWER SAVE MODE

(75) Inventor: Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/345,093

(22) Filed: Jan. 6, 2012

(65) Prior Publication Data

US 2012/0147256 A1 Jun. 14, 2012

Related U.S. Application Data

(62) Division of application No. 11/988,176, filed as application No. PCT/JP2006/313776 on Jul. 11, 2006, now Pat. No. 8,115,862.

(30) Foreign Application Priority Data

Jul. 11, 2005 (JP) ................. 2005-201320
Jul. 11, 2005 (JP) ................. 2005-201321
Jul. 11, 2005 (JP) ................. 2005-201331
Jul. 11, 2005 (JP) ................. 2005-201332

(51) Int. Cl.
| | | |
|---|---|---|
| H04N 5/225 | (2006.01) | |
| H04N 5/222 | (2006.01) | |
| H04K 3/00 | (2006.01) | |
| H04M 3/00 | (2006.01) | |
| H04M 1/00 | (2006.01) | |
| H04W 24/00 | (2009.01) | |

(52) U.S. Cl.
USPC .......... 348/372; 348/333.13; 455/1; 455/418; 455/456.2; 455/550.1

(58) Field of Classification Search
USPC ................. 348/333.13, 372; 455/418, 456.2, 455/550.1, 1
See application file for complete search history.

(56) References Cited

U.S. PATENT DOCUMENTS

| | | | | |
|---|---|---|---|---|
| 5,867,106 A | * | 2/1999 | Bi et al. | ........ 340/5.54 |
| 6,018,642 A | | 1/2000 | Adachi | |
| 6,104,886 A | | 8/2000 | Suzuki et al. | |

(Continued)

FOREIGN PATENT DOCUMENTS

| | | |
|---|---|---|
| JP | A 10-093848 | 4/1998 |
| JP | A-11-88744 | 3/1999 |

(Continued)

OTHER PUBLICATIONS

Jan. 25, 2011 Office Action issued in Japanese Patent Application No. 2005-201320 (with translation).

(Continued)

Primary Examiner — Joel Fosselman
(74) Attorney, Agent, or Firm — Oliff & Berridge, PLC

(57) ABSTRACT

An electronic camera comprises a wireless communication unit that performs wireless communication with a computer or a printer, and a power save mode changeover unit that changes over a power save mode to either an ON or an OFF state according to the operational state of the electronic camera, if the power save mode is changed over to ON by the power save mode changeover unit, the wireless communication unit stops its operation when radio waves are not being transmitted, and if the power save mode is changed over to OFF, the wireless communication unit operates in a standby state when radio waves are not being transmitted.

5 Claims, 26 Drawing Sheets

(56) References Cited

U.S. PATENT DOCUMENTS

| | | |
|---|---|---|
| 6,791,942 B2 | 9/2004 | Jin |
| 7,356,360 B2 | 4/2008 | Katayama et al. |
| 7,586,524 B2 | 9/2009 | Tsue et al. |
| 7,777,779 B2 | 8/2010 | Yasuda |
| 2002/0054233 A1 | 5/2002 | Juen |
| 2002/0086635 A1* | 7/2002 | Tomono .......................... 455/1 |
| 2003/0071912 A1 | 4/2003 | Minakuti |
| 2003/0139138 A1* | 7/2003 | Cho et al. ........................ 455/63 |
| 2005/0134689 A1 | 6/2005 | Hatanaka |
| 2010/0271491 A1 | 10/2010 | Yasuda |

FOREIGN PATENT DOCUMENTS

| | | |
|---|---|---|
| JP | A-2000-307462 | 11/2000 |
| JP | A-2001-111712 | 4/2001 |
| JP | A-2001-285756 | 10/2001 |
| JP | A-2003-169287 | 6/2003 |
| JP | A-2003-244166 | 8/2003 |
| JP | A-2004-023442 | 1/2004 |
| JP | A-2004-534314 | 11/2004 |
| JP | A-2004-349777 | 12/2004 |
| JP | A 2005-020452 | 1/2005 |
| JP | A-2005-86639 | 3/2005 |
| JP | A 2005-167634 | 6/2005 |
| JP | A-2005-184208 | 7/2005 |
| JP | A-2005-184791 | 7/2005 |
| WO | WO 03/001719 A2 | 1/2003 |

OTHER PUBLICATIONS

Jan. 25, 2011 Office Action issued in Japanese Patent Application No. 2005-201321 (with translation).

Jan. 25, 2011 Office Action issued in Japanese Patent Application No. 2005-201332 (with translation).

Japanese Office Action issued May 17, 2011 in Japanese Application No. 2005-201332 (with translation).

Japanese Office Action issued Apr. 26, 2011 in Japanese Application No. 2005-201320 (with translation).

Jan. 28, 2011 Office Action issued in U.S. Appl. No. 11/988,176.

Oct. 13, 2011 Notice of Allowance issued in U.S. Appl. No. 11/988,176.

* cited by examiner

FIG.3

PROFILE OF PC

| ITEM | SIZE (BYTES) | DETAILS | INITIAL VALUE | SETTING |
|---|---|---|---|---|
| VERSION | 1 | PROFILE VERSION | 0 | PC |
| NUMBER OF PROFILES | 1 | TOTAL NUMBER OF PROFILES INCLUDING ZERO (FIXED AT 9) | 9 | CAMERA |
| PROFILE NUMBER | 1 | 1~9 | 1~9 | CAMERA |
| PROFILE VALID / INVALID | 1 | =0: INVALID / =1: VALID | 0 | CAMERA |
| PROFILE NAME | MAX17 | 16 VALID CHARACTERS+NULL-Terminate | (NULL) | PC |
| ICON NUMBER | 1 | 1~9 | 0 | PC |
| DATE AND TIME OF PROFILE GENERATION | 15 | CHARACTER STRING YYYYMMDDTHHmmss (YYYY=YEAR, MM=MONTH 01-12, DD=DAY 01-31, T=CONSTANT CHARACTERS, HH=HOURS 00-23, mm=MINUTES, 00-59 ss=SECONDS 00-59) | (NULL) | PC |
| DATE AND TIME PROFILE LAST ACCESSED | 15 | SAME AS ABOVE | (NULL) | CAMERA |
| ORDER TO DISPLAY IN PROFILE LIST | 1 | 1~9 | 0 | CAMERA |
| CONNECTED DEVICE | 1 | =0:PC/=1:PRINTER | 0 | PC |
| IP ADDRESS | 4 | IP ADDRESS OF WIRELESS LAN MODULE | 0.0.0.0 | PC |
| BIT LENGTH OF SUBNET MASK | 1 | 0~32 | 0 | PC |
| GATEWAY IP ADDRESS | 4 | | 0.0.0.0 | PC |
| TCP/IP SETTINGS | 1 | DHCP/AutoIP/GATEWAY(bit0/1/2) =0: INVALID / =1: VALID | 0 | PC |
| ACCESS METHOD | 1 | =0:INFRASTRUCTURE / =1: AD HOC | 0 | PC |
| CHANNEL | 1 | CHANNEL NUMBER | 10 | PC |
| SSID | MAX32 | 32 VALID CHARACTERS + NULL-Terminate | (NULL) | PC |
| AUTHENTICATION METHOD | 1 | =0: OpenSystem / =1: SharedKey / =2: WPA-PSK | 0 | PC |
| ENCRYPTION MODE | 1 | =0: NONE / =1: WEP64 / =2: WEP128 / =3: TKIP | 0 | PC |
| ENCRYPTION KEY | MAX64 | 63 VALID CHARACTERS + NULL-Terminate | (NULL) | PC |
| ENCRYPTION KEY NUMBER | 1 | 1~4 | 1 | PC |
| GUID OF PC | 16 | | 0 | PC |
| PC NAME (FRIENDLY NAME) | MAX40 | 39 VALID CHARACTERS + NULL-Terminate | (NULL) | PC |

FIG.4

NETWORK INFORMATION FOR PRINTER CONNECTION

| ITEM | SIZE (BYTES) | DETAILS | VALUE |
|---|---|---|---|
| TCP/IP SETTINGS | 1 | DHCP/AutoIP/GATEWAY(bit0/1/2) =0: INVALID / =1: VALID | 2 |
| ACCESS METHOD | 1 | =0: INFRASTRUCTURE / =1: AD HOC | 1 |
| CHANNEL | 1 | CHANNEL NUMBER | 10 |
| SSID | MAX32 | 32 VALID CHARACTERS + NULL-Terminate | "Dongle" |
| AUTHENTICATION METHOD | 1 | =0: OpenSystem / =1: SharedKey / =2: WPA-PSK | 0 |
| ENCRYPTION MODE | 1 | =0: NONE / =1: WEP64 / =2: WEP128 / =3: TKIP | 0 |

FIG.5

PROFILE OF PRINTER

| ITEM | SIZE (BYTES) | DETAILS | INITIAL VALUE | SETTING |
|---|---|---|---|---|
| VERSION | 1 | PROFILE VERSION | 0 | CAMERA |
| NUMBER OF PROFILES | 1 | TOTAL NUMBER OF PROFILES INCLUDING ZERO (FIXED AT 9) | 9 | CAMERA |
| PROFILE NUMBER | 1 | 1~9 | 1~9 | CAMERA |
| PROFILE VALID / INVALID | 1 | =0: INVALID / =1: VALID | 0 | CAMERA |
| PROFILE NAME | MAX17 | 16 VALID CHARACTERS+NULL-Terminate | PrinterN (N=1~9) | CAMERA |
| ICON NUMBER | 1 | 1~9 | 0 | CAMERA |
| DATE AND TIME OF PROFILE GENERATION | 15 | CHARACTER STRING YYYYMMDDTHHmmss (YYYY=YEAR, MM=MONTH 01-12, DD=DAY 01-31, T=CONSTANT CHARACTERS, HH=HOURS 00-23, mm=MINUTES, 00-59, ss=SECONDS 00-59) | (NULL) | CAMERA |
| DATE AND TIME PROFILE LAST ACCESSED | 15 | SAME AS ABOVE | (NULL) | CAMERA |
| ORDER TO DISPLAY IN PROFILE LIST | 1 | 1~9 | 0 | CAMERA |
| CONNECTED DEVICE | 1 | =0:PC/=1:PRINTER | 1 | CAMERA |
| IP ADDRESS | 4 | IP ADDRESS OF WIRELESS LAN MODULE | 0.0.0.0 | CAMERA |
| BIT LENGTH OF SUBNET MASK | 1 | 0~32 | 0 | CAMERA |
| GATEWAY IP ADDRESS | 4 |  | 0.0.0.0 | CAMERA |
| TCP/IP SETTINGS | 1 | DHCP/AutoIP/GATEWAY(bit0/1/2) =0: INVALID / =1: VALID | 2 | CAMERA |
| ACCESS METHOD | 1 | =0:INFRASTRUCTURE / =1: AD HOC | 1 | CAMERA |
| CHANNEL | 1 | CHANNEL NUMBER | 10 | CAMERA |
| SSID | MAX32 | 32 VALID CHARACTERS + NULL-Terminate | "Dongle" | CAMERA |
| AUTHENTICATION METHOD | 1 | =0: OpenSystem / =1: SharedKey / =2: WPA-PSK | 0 | CAMERA |
| ENCRYPTION MODE | 1 | =0: NONE / =1: WEP64 / =2: WEP128 / =3: TKIP | 0 | CAMERA |
| ENCRYPTION KEY | MAX64 | 63 VALID CHARACTERS + NULL-Terminate | (NULL) | CAMERA |
| ENCRYPTION KEY NUMBER | 1 | 1~4 | 1 | CAMERA |
| GUID OF PC | 16 |  | 0 | PRINTER |
| PC NAME (Friendly name) | MAX40 | 39 VALID CHARACTERS + NULL-Terminate | (NULL) | PRINTER |

FIG.7

| PARAMETER | MEANING | VALUE |
|---|---|---|
| GEN REV | SHOWS THE DPOF VERSION. | ・XX.XX |
| GEN CRT | SPECIFIES THE CREATOR, AND DESCRIBES THE DEVICE NAME AND THE SOFTWARE NAME. | ・CHARACTER STRING |
| GEN DTM | SPECIFIES THE DATE AND TIME THAT THIS FILE WAS CREATED. | ・YYYY:MM:DD:HH:mm:ss |
| VUQ RGN | MEANS THE START AND END OF THE VENDOR EXTENDED PARAMETER. | ・BGN: START<br>・END: END |
| VUQ VNM | SPECIFIES THE VENDOR NAME. | ・CHARACTER STRING |
| ITM PID | SPECIFIES THE JOB ID. | ・XXX |
| TRS REQ | SPECIFIES THE REQUEST TO THE PC. | ・"Start": TRANSFER START REQUEST<br>・"Recovery": RECOVERY TRANSFER REQUEST |
| TRS MOD | SPECIFIES THE TRANSFER MODE. | ・"Update": AMONG THE DESIGNATED FILES, ONLY THE IMAGES NOT YET TRANSFERRED TO THE PC ARE TRANSFERRED.<br>・"Force": THE DESIGNATED FILES ARE INDUBITABLY TRANSFERRED. |
| TRS TRG | SPECIFIES THE TRANSFER TARGET. | ・"All": ALL THE FILES STORED IN THE CAMERA ARE THE SUBJECTS FOR TRANSFER. THE FILE LIST IS CREATED UPON THE PC SIDE.<br>・"Select": ONLY THE DESIGNATED FILES ARE TRANSFERRED. THE FILE LIST IS CREATED UPON THE CAMERA SIDE.<br>・"Day": ONLY THE FILES OF THE DAY OF PHOTOGRAPHY DESIGNATED BY TRG DAY ARE COLLATED. THE FILE LIST IS CREATED UPON THE PC SIDE. |
| TRS DAY | IF TRS TRG IS "Day", SPECIFIES THE DAY OF PHOTOGRAPHY. IT IS SUPPOSED TO BE POSSIBLE TO DESIGNATE A PLURALITY OF LINES. | ・YYYY/MM/DD |
| IMG QTY | SPECIFIES THE NUMBER OF FILES IN THE LIST. | ・XXX |
| IMG SRC | SPECIFIES THE FILE PATH. | ・CHARACTER STRING SPECIFYING THE FILE PATH |

FIG.8

(1) EXAMPLE WHEN THE FILE LIST IS NOT MADE ON THE CAMERA SIDE

```
[HDR]
GEN REV=01.10
GEN CRT=" E5200"
GEN DTM=2005:03:12:02:29:35
VUQ RGN=BGN
VUQ VNM=" Nikon Corporation" -ATR" Advanced Transfer V1.0"
[JOB]
ITM PID=001
TRS REQ=" Start"
TRS MOD=" Update"
TRS TRG=" All"
VUQ RGN=END
```

(2) EXAMPLE WHEN THE FILE LIST IS MADE ON THE CAMERA SIDE

```
[HDR]
GEN REV=01.10
GEN CRT=" E5200"
GEN DTM=2005:03:12:02:29:35
VUQ RGN=BGN
VUQ VNM=" Nikon Corporation" -ATR" Advanced Transfer V1.0"
[JOB]
ITM PID=001
TRS REQ=" Start"
TRS MOD=" Force"
TRS TRG=" Select"
ITM QTY=003
IMG SRC=" ../DCIM/100NIKON/DSC0001.JPG"
IMG SRC=" ../DCIM/100NIKON/DSC0010.JPG"
IMG SRC=" ../DCIM/100NIKON/DSC0023.JPG"
VUQ RGN=END
```

FIG.19.1
1
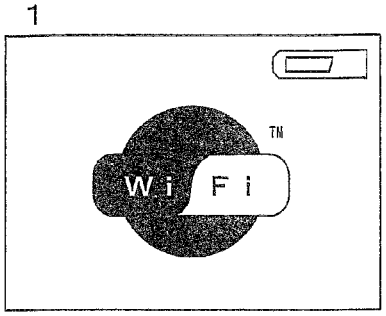
2
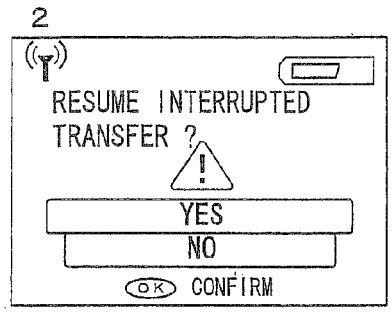
3
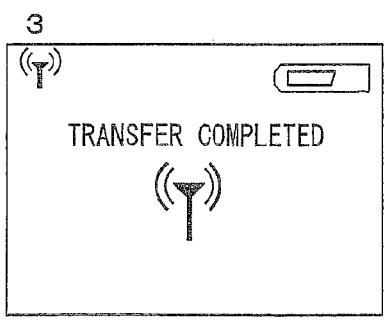
4
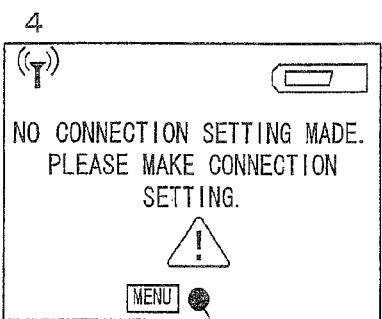
PRINTER SETUP SOFTWARE ICON
5
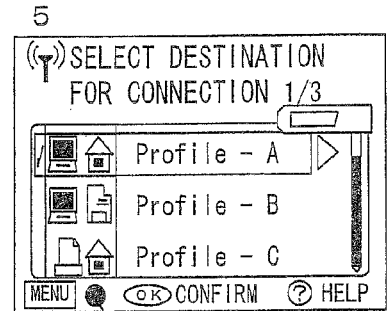
PRINTER SETUP SOFTWARE ICON
DISPLAY ANTENNA IN 5 STAGES
3  2  1  0  NO-SERVICE AREA
6
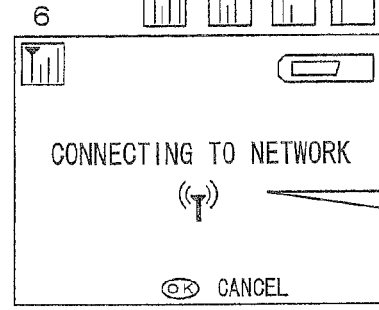
SAME AS ABOVE
7
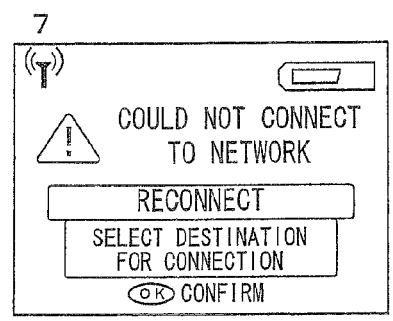
8
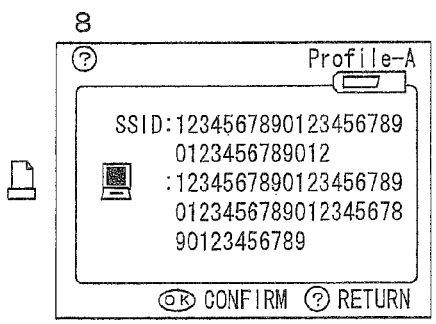

FIG.19.2
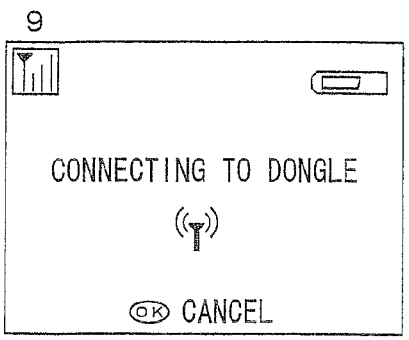
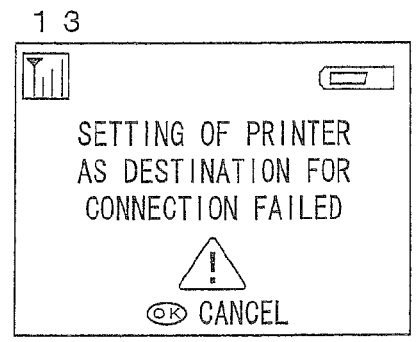
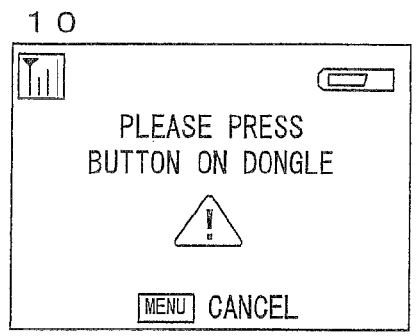
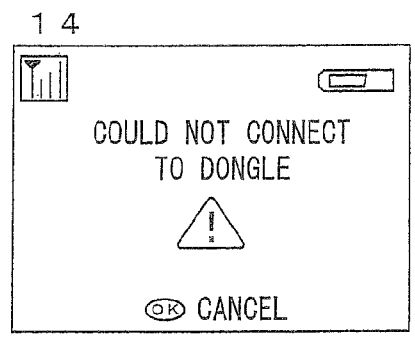
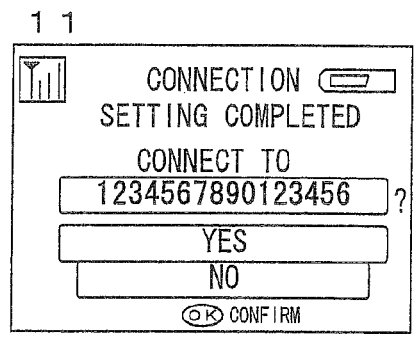
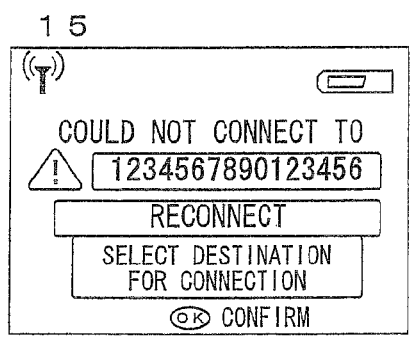
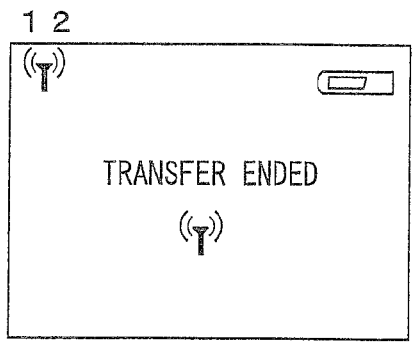

FIG.20
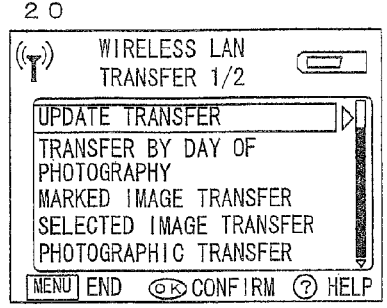
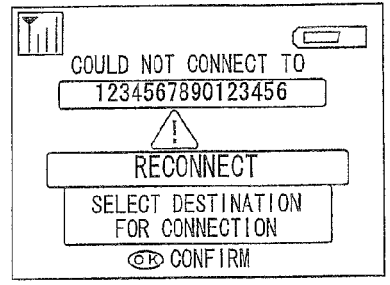
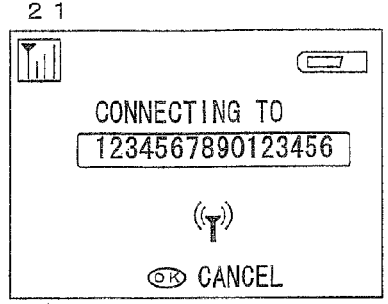
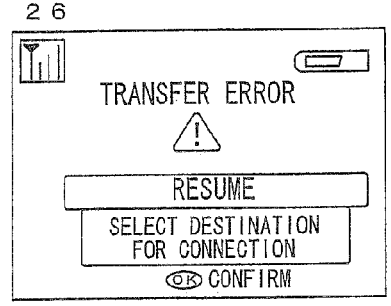
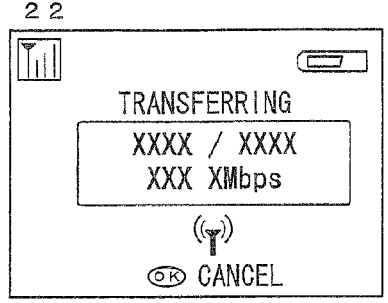
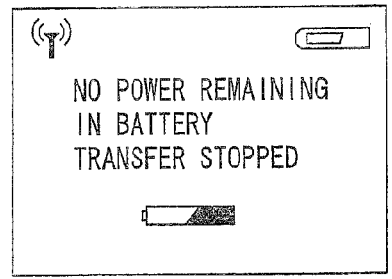
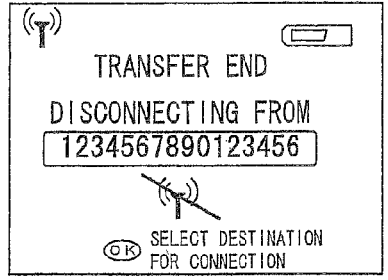
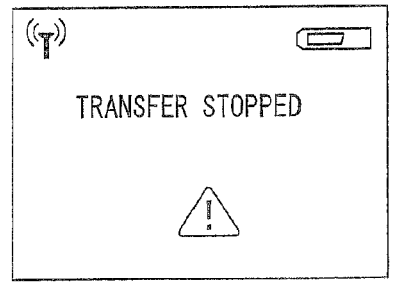
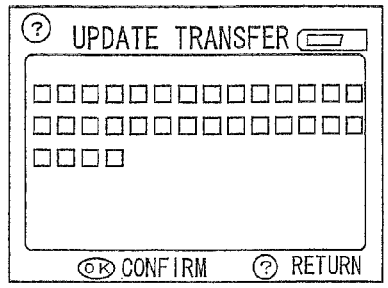

FIG.22
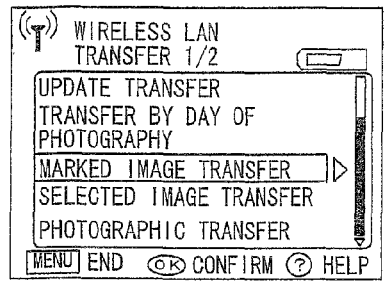
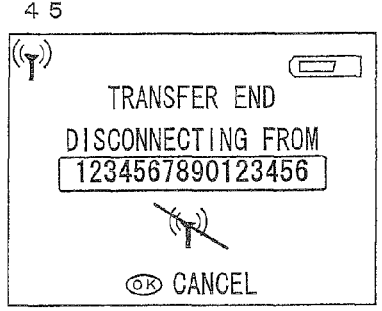
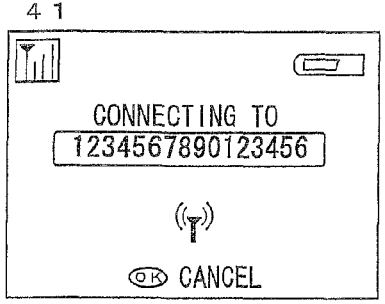
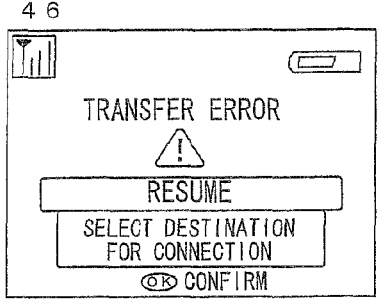
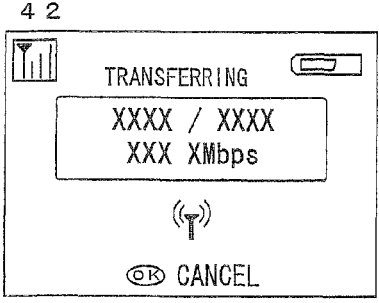
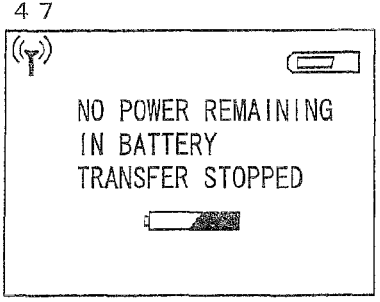
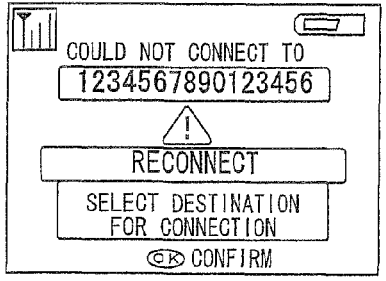
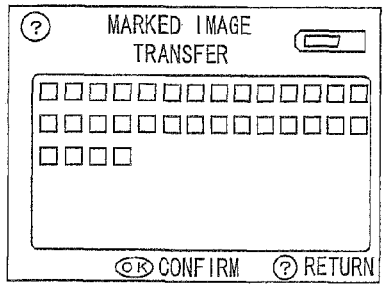

FIG.24.1
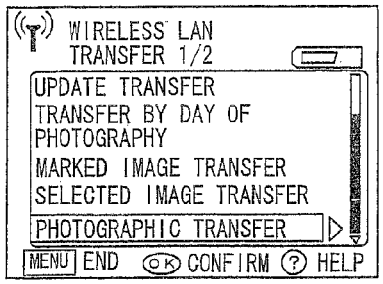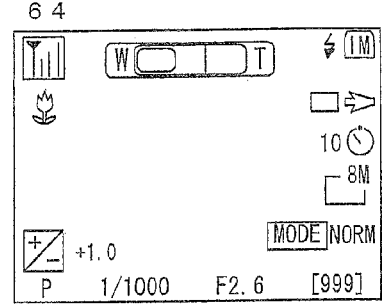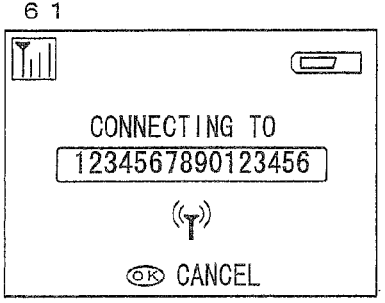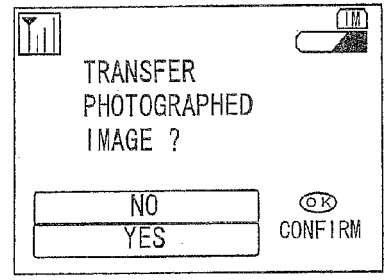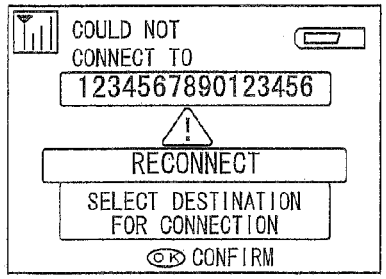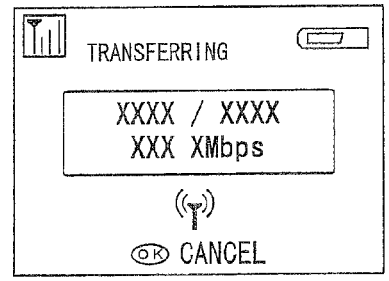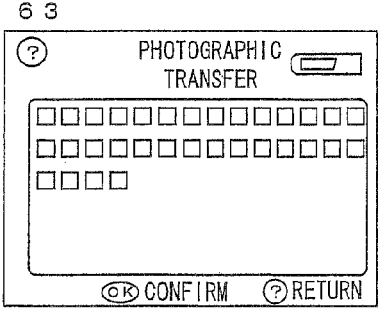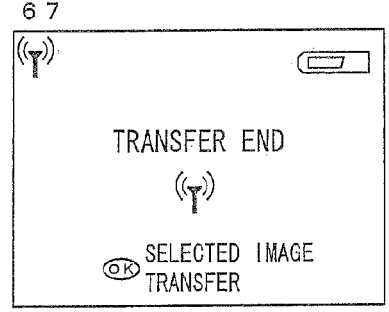

FIG.24.2
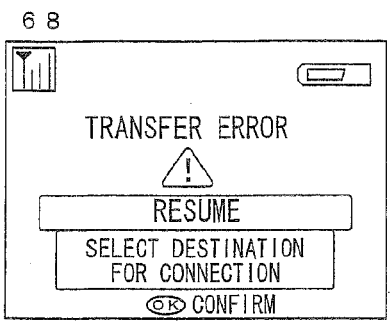
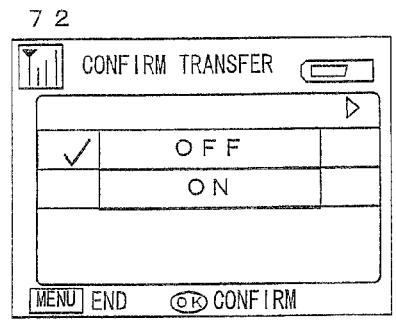
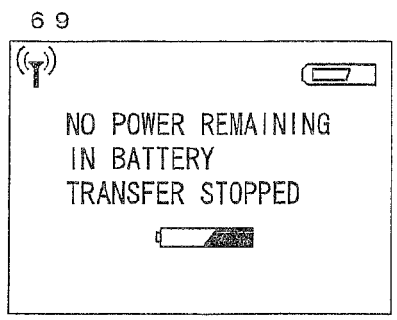
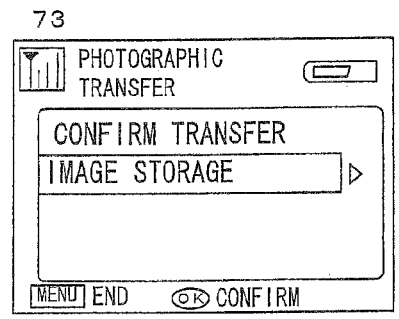
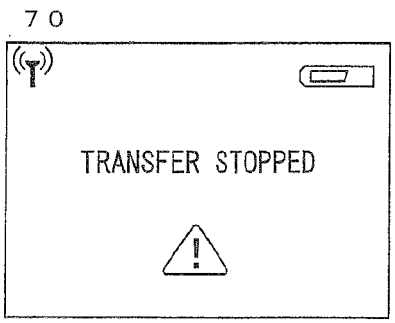
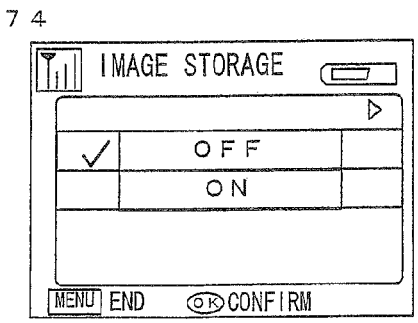
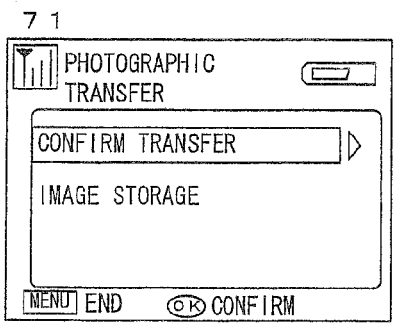

ELECTRONIC CAMERA THAT WIRELESSLY TRANSFERS DATA, WHICH INCLUDES A POWER SAVE MODE

This is a Division of application Ser. No. 11/988,176 filed Jan. 2, 2008, which in turn is a National Phase of PCT/JP2006/313776 filed Jul. 11, 2006, which claims the benefit of Japanese Patent Applications No. 2005-201320 filed Jul. 11, 2005; 2005-201321 filed Jul. 11, 2005; 2005-201331 filed Jul. 11, 2005 and 2005-201332 filed Jul. 11, 2005. The disclosures of the prior applications are hereby incorporated by reference herein in their entirety.

TECHNICAL FIELD

The present invention relates to an electronic camera that transfers captured image data to a computer or to a printer to which the electronic camera is connected via a wireless network.

BACKGROUND ART

A digital camera that is connected to a computer via a wireless LAN, and that transfers captured images to the computer by using the so-called FTP (File Transfer Protocol) is known (see Patent Document #1).
Patent Document 1: Japanese Laid-Open Patent Publication No. 2005-20452.

DISCLOSURE OF THE INVENTION

Problem to be Solved by the Invention

With the digital camera disclosed in Patent Document #1, transmission and reception of radio waves is performed for transferring the captured images to the computer to which the digital camera is connected via the wireless LAN.
Accordingly there is a requirement to keep the electrical power consumption down, since without any measures being taken the amount of electrical power consumption becomes greater than in the case of a normal digital camera.

Means for Solving the Problem

An electronic camera according to a first aspect of the present invention transfers captured image data to a computer or a printer to which the electronic camera is connected via a wireless network, wherein the electronic camera executes various types of operation in order to keep down electrical power consumption.

An electronic camera according to a second aspect of the present invention, in the electronic camera according to the first aspect, comprises a wireless communication unit that performs wireless communication with the computer or the printer and a power save mode changeover unit that changes over a power save mode to either an ON or an OFF state according to the operational state of the electronic camera. It is preferable that the wireless communication unit of the electronic camera according to this aspect, if the power save mode is changed over to ON by the power save mode changeover unit, stops its operation when radio waves are not being transmitted, and if the power save mode is changed over to OFF, operates in a standby state when radio waves are not being transmitted.

An electronic camera according to a third aspect of the present invention, in the electronic camera according to the second aspect, further comprises an image display unit that displays various types of image including a menu screen image for selection of a transfer method for captured image data. It is desirable that the power save mode changeover unit of the electronic camera according to this aspect changes over the power save mode to ON when the menu screen image is being displayed by the image display unit.

According to a fourth aspect of the present invention, in the electronic camera according to the second or third aspect, it is preferable that the power save mode changeover unit changes over the power save mode to OFF when captured image data is transferred.

According to a fifth aspect of the present invention, in the electronic camera according to the fourth aspect, it is more desirable that the power save mode changeover unit changes over the power save mode to ON when transfer of captured image data has terminated.

An electronic camera according to a sixth aspect of the present invention, in the electronic camera according to the first aspect, comprises an image display unit that displays various types of image including a captured image, a wireless communication unit that performs wireless communication with the computer or the printer, an electrical power supply control unit that permits or prohibits supply of electrical power from a battery that supplies electrical power to the image display unit and the wireless communication unit, to the wireless communication unit, an actuation unit for receiving actuation input of an user, a first sleep control unit that, if actuation input by the user upon the actuation unit is not performed for at least a predetermined time period when supply of electrical power from the battery to the wireless communication unit is prohibited by the electrical power supply control unit, transits to a first sleep mode in which operation of the wireless communication unit and the image display unit being stopped, and a second sleep control unit that, if actuation input by the user upon the actuation unit is not performed for at least a predetermined time period when supply of electrical power from the battery to the wireless communication unit is permitted by the electrical power supply control unit, transits to a second sleep mode in which operation of the image display unit being stopped while continuing the operation of the wireless communication unit.

An electronic camera according to a seventh aspect of the present invention, in the electronic camera according to the sixth aspect, further comprises an auto power OFF control unit that turns the power supply to the electronic camera entirely OFF and stops operation thereof if actuation input by the user upon the actuation unit is not performed for at least a predetermined time period after transition to the first sleep mode.

An electronic camera according to an eighth aspect of the present invention, in the electronic camera according to the sixth aspect, further comprises a sleep transition control unit that transits to the second sleep mode during transfer of captured image data, and, after this transfer of captured image data has terminated, transits from the second sleep mode to the first sleep mode if actuation input by the user upon the actuation unit is not performed for at least a predetermined time period.

An electronic camera according to a ninth aspect of the present invention, in the electronic camera according to the seventh aspect, further comprises a sleep transition control unit that transits to the second sleep mode during transfer of captured image data, and, after this transfer of captured image data has terminated, transits from the second sleep mode to the first sleep mode if actuation input by the user upon the actuation unit is not performed for at least a predetermined time period.

According to a tenth aspect of the present invention, in the electronic camera according to the ninth aspect, in case that the power supply to the electronic camera is turned OFF by the auto power OFF unit after transition has taken place from the second sleep mode to the first sleep mode by the sleep transition unit, when the power supply to the electronic camera is turned ON, it is preferably displayed upon the image display unit that the transfer of captured image data terminated.

An electronic camera according to an eleventh aspect of the present invention, in the electronic camera according to the first aspect, comprises a wireless communication unit that performs wireless communication with the computer or the printer, a battery voltage detection unit that detects output voltage of a battery that supplies electrical power to various units of the electronic camera including the wireless communication unit, as a battery voltage, a battery remaining capacity determination unit that determines battery remaining capacity based upon the battery voltage detected by the battery voltage detection unit, and a notification unit that, if determination is made by the battery remaining capacity determination unit that battery remaining capacity is insufficient, notifies an user to that effect. It is preferable that the battery remaining capacity determination unit of the electronic camera according to this aspect, if the wireless communication unit is not operating, determines that battery remaining capacity has become insufficient when the battery voltage drops below a predetermined first threshold value that is determined in advance, and if the wireless communication unit is operating, determines that battery remaining capacity has become insufficient when the battery voltage drops below a predetermined second threshold value that is determined in advance, the second threshold value being lower than the first threshold value.

An electronic camera according to a twelfth aspect of the present invention, in the electronic camera according to the first aspect, comprises a wireless communication unit that performs wireless communication with the computer or the printer, an actuation unit that changes over an operational mode of the electronic camera according to actuation input by an user, a display unit that displays a listing screen for inviting the user to select a destination for connection of the electronic camera, and an electrical power supply control unit that permits or prohibits supply of electrical power to the wireless communication unit. It is preferable that the operational modes that are changed over by the actuation unit of the electronic camera according to this aspect include a wireless LAN mode for connecting the electronic camera to the computer or to the printer via the wireless network. And, it is desirable that the display unit of the electronic camera according to this aspect displays the listing screen when the operational mode of the electronic camera is changed over to the wireless LAN mode by the actuation unit. Moreover, it is preferable that the electrical power supply control unit of the electronic camera according to this aspect prohibits electrical power supply to the wireless communication unit until the listing screen has been displayed upon the display unit and a destination for connection of the electronic camera has been selected by the user upon the listing screen, and permits electrical power supply to the wireless communication unit when a destination for connection of the electronic camera has been selected by the user upon the listing screen.

An electronic camera according to a thirteenth aspect of the present invention, in the electronic camera according to the twelfth aspect, further comprises a replay request unit that receives actuation input from the user in order to display a captured image upon the display unit. When the operational mode of the electronic camera is changed over to the wireless LAN mode by the actuation unit of the electronic camera according to this aspect, it is preferable that actuation input by the user upon the replay request unit is not accepted.

An electronic camera according to a fourteenth aspect of the present invention, in the electronic camera according to the twelfth or thirteenth aspect, further comprises a drive mechanism for driving a photographic lens. When the operational mode of the electronic camera is changed over to the wireless LAN mode by the actuation unit of the electronic camera according to this aspect, it is desirable that the driving of the photographic lens by the drive mechanism is prohibited.

It should be understood that, the wireless communication unit, the power save mode changeover unit, the image display unit, the electrical power supply control unit, the actuation unit, the first sleep control unit, the second sleep control unit, the auto power OFF control unit, the sleep transition control unit, the battery voltage detection unit, the battery remaining capacity determination unit, the notification unit, the display unit, the replay request unit and the drive mechanism described above may be replaced by a wireless communication means, a power save mode changeover means, an image display means, an electrical power supply control means, an actuation means, a first sleep control means, a second sleep control means, an auto power OFF control means, a sleep transition control means, a battery voltage detection means, a battery remaining capacity determination means, a notification means, a display means, a replay request means and a drive means, respectively.

Advantageous Effect of the Invention

According to the present invention, with an electronic camera that performs wireless communication between the electronic camera and a computer or a printer via a wireless network, it is possible to keep the electrical power consumption down.

BRIEF DESCRIPTION OF THE DRAWINGS

FIG. 3 is a figure showing the details of a profile of a PC;

FIG. 4 is a figure showing network information for printer connection;

FIG. 5 is a figure showing the details of a profile of a printer;

FIG. 7 is a table in which the details of parameters used for a command file "ADVTRANS.MRK" have been collected together;

FIG. 8 is a figure showing examples of command files that have been constructed;

FIGS. 19.1 and 19.2 are figures showing examples of screens corresponding to the menu transition figure of FIG. 13;

FIG. 20 is a figure showing an example of screens corresponding to the menu transition figure of FIG. 14;

FIG. 22 is a figure showing an example of screens corresponding to the menu transition figure of FIG. 16;

FIGS. 24.1 and 24.2 are figures showing an example of screens corresponding to the menu transition figure of FIG. 18.

EXPLANATION OF THE REFERENCE SYMBOLS

Figure 1:
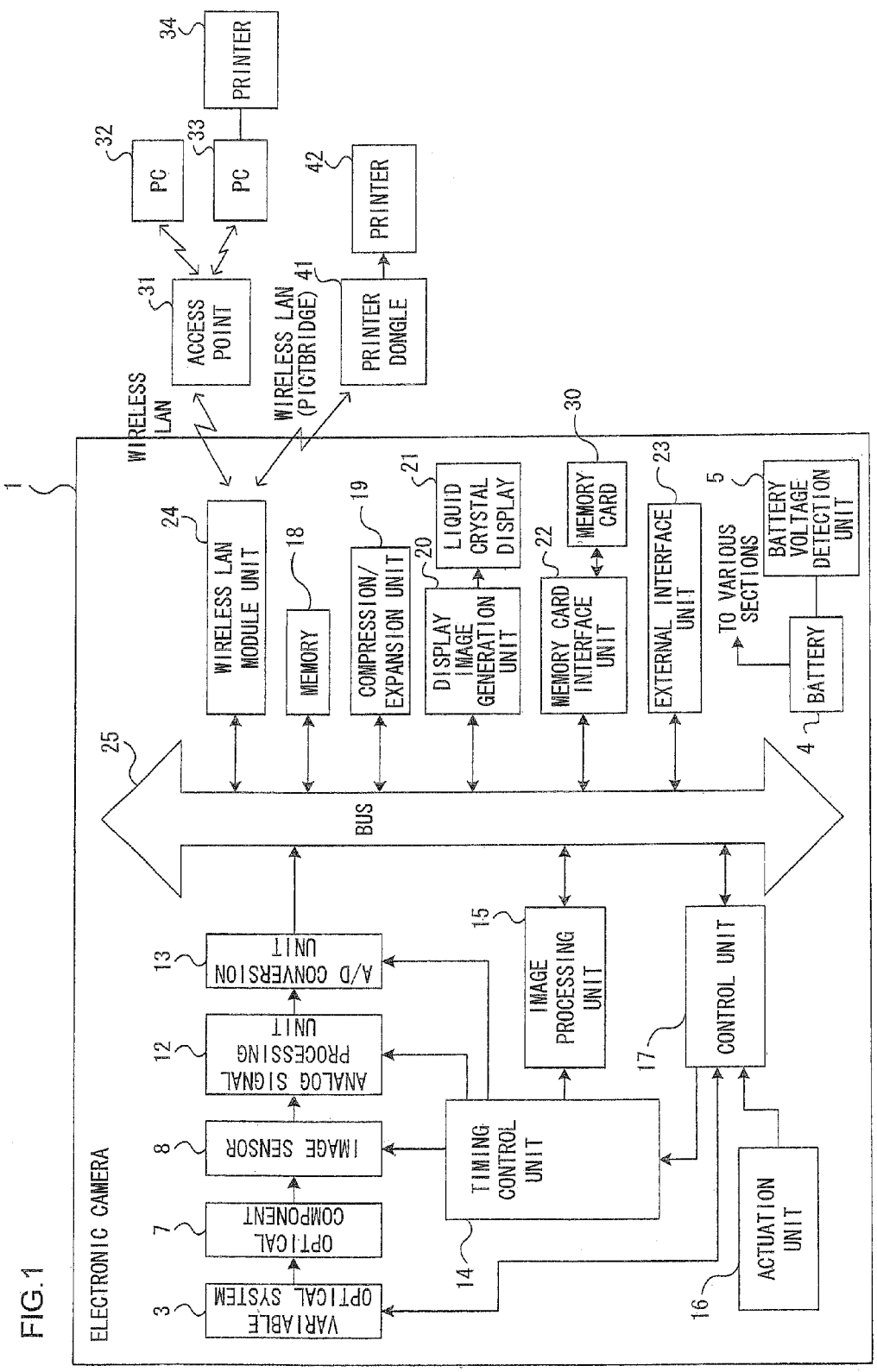
FIG. 1 is a block diagram of an electronic still camera (an electronic camera) that is equipped with a wireless LAN connection function, according to an embodiment of the present invention.

1: electronic camera
4: battery
5: battery voltage detection unit
16: actuation unit
17: control unit
18: memory
21: liquid crystal display
24: wireless LAN module unit
30: memory card
31: access point
32, 33: PCs
34, 42: printers
41: printer dongle

BEST MODE FOR CARRYING OUT THE INVENTION

1. Structure

FIG. 1 shows a block diagram of an electronic still camera (hereinafter termed an electronic camera) equipped with a wireless LAN connection function, according to an embodiment of the present invention. The electronic camera 1 is connected via an access point 31 to a PC (personal computer) 32 or PC 33 via a wireless LAN. The connection mode of the wireless LAN at this time is the so-called infrastructure mode. The PCs 32 and 33 acquire image data captured by the electronic camera 1, and store therein the image data and/or perform various types of image processing and the like thereupon. A printer 34 is connected to the PC 33, and it is possible to print image corresponding to image data that has been acquired by the PC 33 upon the printer 34.

Furthermore, the electronic camera 1 can be connected to a printer 42 via a printer dongle 41 by wireless LAN. The printer dongle 41 is a print server for wireless LAN that is used by fitting it to a USB (Universal Serial Bus) port or the like of the printer 42. Image data that has been received from the electronic camera 1 by the printer dongle 41 is outputted to the printer 42. By doing this, printing of the image by the printer 42 is performed without using any PC. The connection mode of the wireless LAN at this time is the so called ad hoc mode.

The electronic camera 1 includes a battery 4, a battery voltage detection unit 5, a variable optical system 3, an optical component 7, an image sensor 8, an analog signal processing unit 12, an A/D conversion unit 13, a timing control unit 14, an image processing unit 15, an actuation unit 16, a control unit 17, a memory 18, a compression/expansion unit 19, a display image generation unit 20, a liquid crystal display 21, a memory card interface unit 22, an external interface unit 23, and a wireless LAN module unit 24.

The battery 4 supplies the electrical power to the various units of the electronic camera 1 that is required for their operation. The electrical power supply from the battery 4 to these various units is permitted or prohibited according to the operational state of the electronic camera 1. Control of the electrical power supply is performed by the control unit 17. The output voltage of the battery 4 (the battery voltage) is detected by the battery voltage detection unit 5. The result of this detection of the battery voltage is outputted from the battery voltage detection unit 5 to the control unit 17.

The variable optical system 3 includes a photographic lens that is made up of a plurality of optical lens groups, an iris, a shutter, and so on. The optical component 7 includes an optical filter, a cover glass and the like. An image of the photographic subject is imaged upon the image sensor 8 by a ray bundle from the photographic subject passing through the variable optical system 3 and the optical component 7.

The image sensor 8 captures an image of the photographic subject that is imaged by the variable optical system 3, and outputs an image signal (an image capture signal) corresponding to the image of the photographic subject that has been captured. The image sensor 8 includes an image capture region which is rectangular and in which a plurality of picture elements are arranged, and outputs to the analog signal processing unit 12 an analog image signal corresponding to the electric charges accumulated upon the picture elements, sequentially in picture element units. The image sensor 8 may be constituted by, for example, a single chip type color CCD or the like. The analog signal processing unit 12 includes in its interior a CDS (Correlated Double Sampling) circuit and an AGC (auto gain control) circuit and the like, and performs predetermined analog processing upon the image signal that has been inputted. The A/D conversion unit 13 converts the analog signal that has been processed by the analog signal processing unit 12 into a digital signal. And the timing control unit 14 is controlled by the control unit 17, and controls the timings of the various operations of the image sensor 8, the analog signal processing unit 12, the A/D conversion unit 13, and the image processing unit 15.

The memory card interface unit 22 provides an interface with a memory card (a card type removable memory) 30 that has been loaded into the interior of the electronic camera 1. The external interface unit 23 provides an interface with an external device via a cable, according to a signal standard like USB or the like. The wireless LAN module unit 24 performs processing upon data such as format conversion and encoding, demodulation, frequency conversion, and so on, and transmits and receives wireless LAN radio waves to and from the access point 31 or the printer dongle 41.

The actuation unit 16 includes various types of actuation button and switches or the like. These include a release button, a selection dial (a mode dial) for changing over the camera mode, a button (a replay button) for displaying a replay image upon the liquid crystal display 21, a button (an actuation button) for shifting a selection position upon an operation screen that is being displayed upon the liquid crystal display 21, and the like. The liquid crystal display 21 displays various types of operation screen corresponding to the operation state of the electronic camera 1, and displays a replay image based upon an image of the photographic subject that has been captured by the image sensor 8 or image data that is stored upon the memory card. The output of the actuation unit 16 is inputted to the control unit 17, and the output of the display image generation unit 20 is inputted to the liquid crystal display 21. The image processing unit 15 may be constituted by, for example, a dedicated single chip image processing microprocessor. A flash memory is used for the memory 18, and software for controlling the electronic camera 1 or data such as a profile that will be described hereinafter or the like is recorded therein.

The A/D conversion unit 13, the image processing unit 15, the control unit 17, the memory 18, the compression/expansion unit 19, the display image generation unit 20, the memory card interface unit 22, the external interface unit 23, and the wireless LAN module unit 24 are mutually connected together via the bus 25.

With the electronic camera 1 having a structure such as shown in FIG. 1, when a user selects photographic mode and presses the release button by actuation of the actuation unit 16, the control unit 17 controls the variable optical system 3 to perform focus adjustment and also performs timing control via the timing control unit 14 of the image sensor 8, the analog signal processing unit 12, and the A/D conversion unit 13, thereby captures an image of the photographic subject. It should be understood that it would also be acceptable to make it possible to select one of a plurality of photographic modes according to the type of the photographic subject or the like so as to vary the timing control according to the selected photographic mode.

The image sensor 8 generates an image signal corresponding to an image of the photographic subject that has been imaged upon its image capture region by the variable optical system 3. The image signal is subjected to predetermined analog signal processing by the analog signal processing unit 12, and is outputted to the A/D conversion unit 13 as an image signal having undergone analog processing. The image signal having undergone analog processing is digitalized by the A/D conversion unit 13, and the digitized image signal is supplied to the image processing unit 15 as image data.

In an example of the electronic camera 1 of this embodiment, the most representative single chip type color image sensor in which R (red), G (green) and B (blue) color filters are arranged in a Bayer array is used as the image sensor 8. And the image data that is supplied to the image processing unit 15 is expressed in the RGB color system.

Individual picture elements that make up the image data have color information for just one of the color components R, G, and B is present. Here, a single one of the photoelectric conversion elements that make up the image sensor 8 is termed a picture element, and moreover the single unit of image data that corresponds to the picture element is also termed a picture element. Furthermore, it is noted that the image itself consists of a plurality of picture elements.

The image processing unit 15 performs image processing such as interpolation, tone conversion, contour accentuation, and the like upon the image data. The image data upon which the image processing has been completed is subjected, according to requirements, to predetermined compression processing by the compression/expansion unit 19, and is then recorded upon the memory card 30 via the memory card interface unit 22. It should be understood that it is supposed that interpolation processing has been completed upon the image data upon which image processing has been completed, so that color information for all of the color components R, G, and B for each of the picture elements is present.

Image data recorded upon the memory card 30 is wirelessly transmitted to the access point 31 or the printer dangle 41 via the wireless LAN module unit 24. The wireless transmission is performed in conformity with a typical signal standard for wireless LAN, for example the IEEE 802.11b or IEEE 802.11g standard or the like. Furthermore, it would also be acceptable to arrange for this transmission to be compatible with WiFi (Wireless Fidelity) authentication, that is an international standard for ensuring compatibility between various types of wireless LAN device. The access point 31 relays the image data that has been transmitted from the wireless LAN module unit 24 of the electronic camera 1, and transfers it to the PC 32 or the PC 33. And the printer dangle 41 outputs the image data that has been transmitted from the wireless LAN module unit 24 to the printer 42.

As has been explained above, by connecting together the electronic camera 1 and the PC 32, the PC 33, or the printer 42 via a wireless LAN, captured image data may be transmitted to the PC 32, to the PC 33, or to the printer 42 from the electronic camera 1. It should be understood that the transmission of the image data from the electronic camera 1 is performed according to the so called PTPIP (Picture Transfer Protocol over Internet Protocol), that is a well known communication protocol. As the printer 42, one is used that is compatible with the PictBridge standard.

2. Setting Up the Wireless LAN

Next, the method for setting up the wireless LAN will be explained. In order to transmit image data by connecting between the electronic camera 1 and the PC 32, the PC 33, or the printer 42 via wireless LAN in the manner explained in the above description, it is necessary to register the required information for connection to the wireless LAN in advance in the electronic camera 1. It is necessary to perform the registration of the connection information for each device to which the electronic camera 1 is connected (the PCs 32 and 33 and the printers 34 and 42), and the method of registration is different when the device to be connected is a PC and when it is a printer. In the following, first the method of registration of the connection information for the PC 32 will be explained, and thereafter the method of registration of the connection information for a the printer 42 will be explained.

Registration of the connection information for the PC 32 is performed in the state in which the electronic camera 1 and the PC 32 are connected together with a cable. It should be understood that the electronic camera 1 is connected to a cable via the external interface unit 23. With the electronic camera 1 is connected to the PC 32 with the cable, the mode dial of the actuation unit 16 is actuated to set a position "SETUP" upon the electronic camera 1, and a software program for wireless LAN setting that has been installed in advance is executed upon the PC 32. By doing this, information of various types including network information related to setting up a wireless LAN is transmitted from the PC 32 to the electronic camera connected with the cable.

Due to processing by the control unit 17, the electronic camera 1 receives the various information as described above that has been transmitted from the PC 32 and thereby acquires it, and generates data so called "profile" including information for connection to the PC 32 via a wireless LAN based upon the acquired information. And, by writing the profile that has been generated into the memory 18 and thereby storing it, the profile is registered upon the electronic camera 1. By registering the profile in this manner, the information for connection to the PC 32 is registered in the electronic camera 1. Based upon the contents of the profile, connection processing when connecting the electronic camera 1 to the PC 32 via a wireless LAN is performed by the wireless LAN module unit 24.

Figure 2:
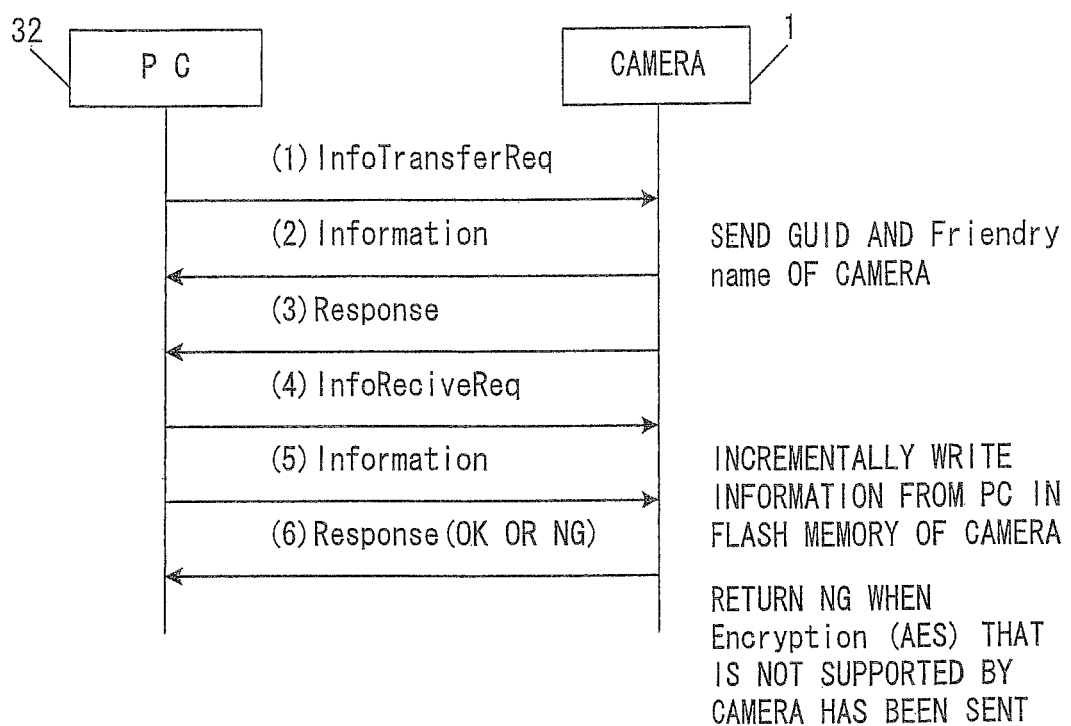
FIG. 2 is a figure showing a processing sequence when registering a profile.

The processing sequence when registering the profile of the PC 32 upon the electronic camera 1 is shown in FIG. 2. This processing sequence is performed according to the so called PTP (Picture Transfer Protocol). Initially, with an InfoTransferReq command (1), the PC 32 requests the electronic camera 1 that is connected to transmit information related to the camera (i.e. camera information). Upon receipt thereof, with an Information command (2), the electronic camera 1 transmits to the PC 32 as its own camera information, that is, data consisting of a GUID (Global Unique ID) and a Friendly Name. When transmission of the camera information has been completed, the PC 32 is informed of the fact that transmission has been ended with a Response command (3). And the camera information for the electronic camera 1 that has been received by the PC 32 is registered in the PC 32 to be used for a decision as to whether or not to permit connection to the electronic camera 1 as will be explained hereinafter.

The above described GUID is created based upon the MAC (Media Access Control) address that is set in advance in the wireless LAN module unit 24. For example, a sixteen byte GUID may be created by repeating the six byte MAC address three times, and by truncating the last two bytes. The MAC address is unique to each individual camera, and is never duplicated by any other camera. Accordingly, the GUID is also set uniquely. The contents of the Friendly Name is set in advance for the electronic camera 1 according to its device type.

When with the Response command (3) the notification of the end of transmission is received by the PC 32 from the electronic camera 1, it requests the electronic camera 1 to receive data transmitted from the PC 32 with an InfoReceiveReq command (4). And thereafter the network information for the wireless LAN that is recorded in the PC 32 is transmitted to the electronic camera 1 with an Information command (5). At this time, along with the network information, device information related to the PC 32 and management information for the profile and the like are also transmitted together. The concrete details of these various types of information will be explained hereinafter with the details of the profile.

When the electronic camera 1 has received these various types of information including the network information from the PC 32 with the Information command (5), then it generates the profile of the PC 32 based upon the contents thereof. The generated profile is written into the memory 18. When the profile of the PC 32 has been written into the memory 18, the result of registration of the connection information is notified from the electronic camera 1 to the PC 32 with a Response command (6). At this time, if the profile is generated correctly, then a notification is issued that the result of registration is OK. But if no profile is generated, for example if an encryption format of AES (Advanced Encryption Standard) or the like that is not supported by this electronic camera 1 is shown in the network information from the PC 32, then a notification is issued that the result of registration is NG. The user is notified by displaying the result of registration upon the screen of the PC 32. By the processing sequence explained above, the profile of the PC 32 is registered upon the electronic camera 1.

The details of the profile that is generated for the PC 32 are shown in the table of FIG. 3. In this table, there are shown the item name of each data item included in the profile, its data size, the contents of the data, and its initial value. It should be understood that the column "setting" shows whether the value of each data item is set by the PC 32 or by the electronic camera 1. A data item for which "PC" is in this column is one that is set by the PC 32 and that is transmitted to the electronic camera 1. And a data item for which "camera" is in this column is one that is set by the electronic camera 1. In the following, each of these data items will be explained.

"Version" specifies the version of the profile, and is set by the management information of the profile that is transmitted from the PC 32. If the software program for the wireless LAN setting of the PC 32 has been upgraded or the like, then the value of this "version" changes. "Number of profiles" specifies the total number of profiles that can be registered in the electronic camera 1. Here it is supposed that profiles can be registered up to a total of nine types, and this value is fixed at nine.

"Profile number" specifies the number that has been allocated to the profile, and is here taken as being any value from 1 through 9. When the profile is being registered in the electronic camera 1, this "profile number" is automatically allocated according to the order of its registration. In the electronic camera 1, by changing the value of "profile number" for each profile, it is possible to register profiles up to a total of nine types. In other words, it is possible to register the connection information for, at maximum, up to nine PCs and/or printers in the electronic camera 1.

"Profile valid/invalid" specifies whether or not the profile is valid: if the value of "Profile valid/invalid" is 0 then that shows that the profile is invalid, while if it is 1 then the profile is valid. A profile that is set as invalid cannot be used and connection to the device that this profile shows cannot be established. A newly registered profile is set as valid, and is set to invalid when the profile is deleted. In other words, when once deleted, a profile is still stored in the electronic camera 1. It should be understood that, when actuation is performed to clear the setting information in the electronic camera 1, all of the profiles are deleted and set to be ineffective. In order to eliminate a profile completely from the electronic camera 1, it is necessary to perform actuation for returning the information in the camera to its value upon shipment from the factory.

The "profile name", "icon number", and "date and time of profile generation" explained below are all set according to the profile management information that is transmitted from the PC 32. "Profile name" specifies a title for identifying the profile. The user is able to set any desired profile title for the PC 32. When the profile is registered in the electronic camera 1, the profile title that has been set is transmitted with the network information from the PC 32 to the electronic camera 32 as profile management information, as previously described. By doing this, the details of the profile name, in other words its text value, is determined.

"Icon number" specifies the type of icon that has been set for the profile, and can take any value from 1 through 9. The user is able to select any desired one of various types of icon for the PC 32, for example whether it is a PC or a printer, or whether it is for household use or office use, or the like. And "date and time of profile generation" specifies the date and the time that the profile was created; the date and the time that were measured by the PC 32 are set.

It should be understood that, when a device to which connection is to be established is to be selected on the electronic camera 1, the titles of the various profiles as specified by the above described "profile name" and an icon for each profile as specified by "icon number" are displayed upon the liquid crystal display 21 as a profile listing screen. The user is able to select the device to which connection is to be made from the titles and icons of the various profiles that are displayed.

The "date and time profile last accessed" and "order to display in profile list" explained below are both set by the electronic camera 1. "Date and time profile last accessed" specifies the last date and time that the profile has been selected by the electronic camera 1. The value of "date and time profile last accessed" is automatically updated when some profile is selected by the electronic camera 1 and connection to a wireless LAN is performed based upon the wireless LAN setting information specified by that profile.

"Order to display in profile list" specifies the order of display when displaying the title and the icon for each profile upon the profile listing screen. The smaller the value of "order to display in profile list" is, the higher is the order of display. The value is set to 1 for a profile that has been selected by the user as the destination for connection of the electronic camera 1 or for a profile that has been newly registered, and the values of the other profiles are moved down accordingly. By doing this, when the profile listing screen is next displayed, the profile that was selected the last time or the profile that was registered is displayed at the head of the listing.

"Connected device" specifies whether the setting information for wireless LAN connection that is recorded in the profile is for a PC or for a printer. If the value of "connected device" is 0 then this specifies that this profile is for a PC, while if the value is 1 then this specifies that this profile is for a printer. In other words, in the profile of the PC 32, the value is set to 0. "Connected device" is determined by the profile management information that is transmitted from the PC 32.

The items from "IP address" to "encryption key number" explained below are set according to the network information that is transferred from the PC 32. "IP address" specifies the IP address that is allocated to the electronic camera 1 (i.e. to the wireless LAN module unit 24) in the profile, and "bit length of subnet mask" specifies the bit length of the subnet mask for the IP address. It should be understood that, if DHCP (Dynamic Host Configuration Protocol) or AutoIP is valid in "TCP/IP settings" that will be explained later, then initial values of 0 are set for the values of the above items. And, if Gateway that will be explained later is valid in "TCP/IP settings", then "gateway IP address" specifies the IP address of this gateway.

"TCP/IP settings" specifies the acquisition method for an IP address in the profile, and shows, for each of DHCP, AutoIP, and Gateway, whether it is valid or invalid. If DHCP is valid, then the IP address of the electronic camera 1 is automatically allocated by the access point 31 or the PC 32. If AutoIP is valid, then the IP address of the electronic camera 1 is automatically allocated by the electronic camera 1 itself. And, if Gateway is valid, then a fixed IP address that is set to the IP address described above is used.

"Access method" specifies whether the method of wireless LAN connection in the profile is the infrastructure mode or the ad hoc mode. In the profile of the PC 32, a 0 of the value specifies the infrastructure mode is set to "access method". "Channel" specifies the wireless LAN transmission channel. And "SSID" specifies the SSID (Service Set Identifier) of the wireless LAN that is related to the PC 32. These details are determined according to the wireless LAN setting conditions of the PC 32.

"Authentication method", "encryption mode", "encryption key", and "encryption key number" explained below specify information related to security settings when connecting the electronic camera 1 and the PC 32 together via a wireless LAN. These details are determined according to the wireless LAN setting conditions of the PC 32. "Authentication method" specifies one of the authentication methods "open system", "shared key", and WPA-PSK (Wi-Fi Protected Access Pre-Shared Key). "Encryption mode" specifies one of the encryption methods "none", WEP (Wired Equivalent Privacy) 64, WEP 128, or TKIP (Temporal Key Integrity Protocol). And "encryption key" and "encryption key number" specify the details of the encryption key to be used for the wireless LAN and its encryption key number. Authentication and encoding of transmitted data when wireless LAN connecting is performed according to these details.

The "GUID of PC" and "PC name" explained below are determined according to the device information that is transmitted from the PC 32. "GUID of PC" specifies the GUID of the PC 32. The contents thereof is generated by the PC 32 based upon the MAC (Media Access Control) address of the PC 32, in a similar manner to that for the GUID of the electronic camera 1, as described above. And "PC name" specifies the Friendly Name of the PC 32, and is set in advance by the PC 32 in a similar manner to the Friendly Name of the electronic camera 1, as described above.

By the profile that consists of the various data items as explained above being generated and registered by the electronic camera 1, the connection information for the PC 32 is registered in the electronic camera 1. In a similar manner for the PC 33 as well, the PC 33 is connected to the electronic camera 1 by a cable, and, by registering the profile that is generated, the connection information for the PC 33 is registered.

Next, the method for registering the connection information for the printer 42 will be explained. The registration of the connection information of the printer 42 is performed, not by cable connection as when performing it with the PC 32, but by wirelessly connecting the electronic camera 1 and the printer dangle 41 together. The wireless connection is performed by wireless LAN connection using the network information shown in the table of FIG. 4. The network information of FIG. 4 is stored in advance in the wireless LAN module unit 24 as dedicated network information for printer connection.

In the network information of FIG. 4, the value of "TCP/IP settings" is 2. In other words, AutoIP is set to valid, so that the IP address of the electronic camera 1 is automatically allocated by the electronic camera 1 itself. Since the value of "access method" is set to 1, the wireless LAN module unit 24 and the printer dongle 41 are connected together in the ad hoc mode. Although the value of "channel" is 10, the characters "Dongle" are set in "SSID". Since the values of "authentication method" and "encryption mode" are both set to 0, accordingly the wireless LAN module unit 24 and the printer dongle 41 are connected together with authentication of the wireless LAN not being performed, and moreover with the data not being encrypted.

When the wireless LAN module unit 24 and the printer dongle 41 are connected together by wireless LAN based upon the network information described above, the message "Please press button of dongle" is displayed upon the liquid crystal display 21. When in response to the message the user presses a switch that is installed upon the printer dongle 41, the GUID and the Friendly Name of the printer dongle 41 are transmitted from the printer dongle 41 to the electronic camera 1 as device information related to the printer 42. At this time network information and profile management information are not transmitted differently from the case of the PC 32. The electronic camera 1 generates a profile for the printer 42 based upon the device information and the network information of the printer connection previously described, and writes it into the memory 18, thus storing it. In this manner, the connection information for the printer 42 is registered in the electronic camera 1.

The details of the profile that is generated for the printer 42 are shown in FIG. 5. The various data items in the profile are compatible with the profile of the PC 32 shown in FIG. 3. However, since network information and profile management information are not transmitted from the printer dongle 41, accordingly, depending upon the data items in question, some of their setting methods are different from those in the profile for the printer 32 explained with reference to FIG. 3. In the following, explanation of the portions that are the same as FIG. 3 will be omitted, and only the points of difference will be explained.

"Version", "profile name", "icon number", "date and time of profile generation" and "connected device" are different from those of the profile of the PC 32 of FIG. 3, and their details are set by the electronic camera 1. The value of "version" is determined according to the firmware version of the electronic camera 1. The title "Printer N" determined in advance is set in "profile name". In this "N", one of the values from 1 to 9 is set automatically, in the order of generation of the profile. In "icon number", a value that specifies the value of the printer icon is set automatically. In "date and time of profile generation", the date and time of generation, that are obtained according to the clock information held by the electronic camera 1 are set as the date and time of generation of this profile. And 1 is set in "connected device", that is the value that specifies a printer.

Among the items from "IP address" to "encryption key number" that specify the network information, for those from "TCP/IP settings" to "encryption mode", the details are set by the electronic camera 1 in the same way as in FIG. 4. For the other items, the initial value for each of them is set by the electronic camera 1. In "GUID of printer" and "printer name", the values that are transmitted from the printer dongle 41 are set.

By the profile that is constituted by the various data items as explained above being generated and registered by the electronic camera 1, the connection information of the printer 42 is registered in the electronic camera 1.

It should be understood that, with the printer 34 that is connected to the PC 33, it is possible to generate a profile in a similar manner to the PC 33 by connecting the electronic camera 1 and the PC 33 together via a cable. In this profile, the items related to the network information (from "IP address" to "encryption key number") are set with the same values as for the PC 33, and details are set for the other items corresponding to the printer 34. When a wireless LAN connection is set up by using the profile of the printer 34, a communication circuit is established virtually between the electronic camera 1 and the printer 34 by the electronic camera 1 and the PC 33 being connected together.

By connecting together the electronic camera 1 and any one of the PCs (here, this will be explained as being the PC 32) by cable connection, the details of the profile explained above is displayed upon the PC 32. And the profile can be corrected according to requirements. At this time, the PC 32 is able to display not only its own profile but also the details of all of the profiles that are registered upon the electronic camera 1. The display of profile details is performed by transmitting the profile data from the electronic camera 1 to the PC 32.

However, in the display of profile details as described above, it is not the case that it is possible to display all of the data items in a profile. For data items that it is not appropriate to display except upon the PC that is registered in that profile, by not transmitting them from the electronic camera 1, it is arranged not to display them upon the PC 32. For example, it is arranged not to transmit data items related to network security settings, such as authentication method, encryption mode, encryption key, encryption key number and the like, from the electronic camera 1 to the PC 32. By this procedure, it is possible for the user to perform checking and editing of the details of the profiles in a simple manner, while ensuring the necessary security.

3. Connecting to the Wireless LAN

Figure 6:
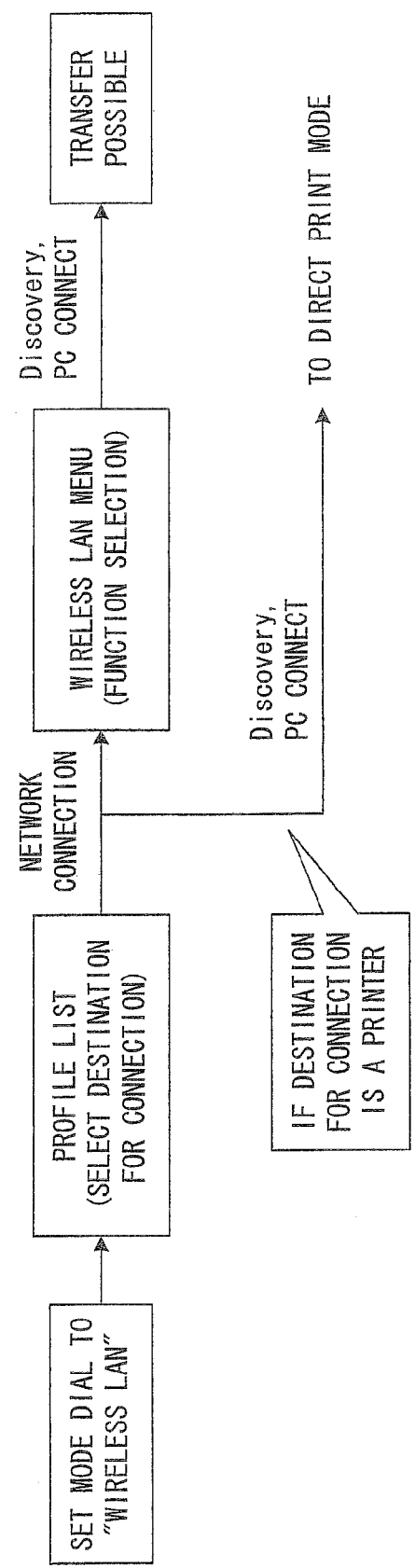
FIG. 6 is a figure showing the flow of operations when connecting an electronic camera to some device with a wireless LAN.

Next, the operation will be explained of wireless LAN connecting the electronic camera 1 to any one of the PC 32, the PC 33, or the printer 42, based upon the wireless LAN connection information that has been registered as explained in the above description. The flow of operations at this time is shown in FIG. 6.

First, when the user actuates a mode dial that is one section of the actuation unit 16 on the electronic camera 1 to set the mode dial to a position "wireless LAN", the operational mode of the electronic camera 1 is changed over to the wireless LAN mode. As a result, a profile listing screen in order for the user to select a destination for connection is displayed upon the liquid crystal display 21. On the profile listing screen, a list is displayed of the profile titles and icons for the various profiles that are registered. It should be understood that, as previously described, the display order of the various profiles is determined according to the values that are set in the data items "order to display in profile list" in the profiles.

When a profile corresponding to any one of the PC 32, the PC 33, or the printer 42 has been selected by the user upon the profile listing screen, then connection processing to the selected device is started, based upon the wireless LAN connection information that is recorded in the profile. At this time, the operation of the electronic camera 1 is varied depending on a connected device being a PC or a printer. In the following, the details of the operation when a wireless LAN connection with the first PC 32 is to be established will be explained, and thereafter the details of the operation when a wireless LAN connection with the printer 42 is to be established will be explained.

When the profile of the PC 32 is selected by the user, then the supply of electrical power from the battery 4 to the wireless LAN module unit 4 is permitted by the control unit 17, and transmission and reception of radio waves between the wireless LAN module unit 24 and the access point 31 is performed. Until this time point, the supply of electrical power to the wireless LAN module unit 24 is prohibited by the control unit 17. And, due to the wireless communication that is performed between the wireless LAN module unit 24 and the access point 31 based upon the wireless LAN connection information that is recorded in the profile that has been selected, network processing such as wireless LAN authentication and IP address acquisition and the like is executed, and the electronic camera 1 is connected to the wireless LAN to which the PC 32 belongs. It should be understood that, at this time point, the electronic camera 1 is only connected to the wireless LAN, and its connection with the PC 32 is not yet performed.

When the electronic camera 1 has been connected to the wireless LAN as described above, function selection of the electronic camera 1 is performed. In concrete terms, a wireless LAN menu screen is displayed upon the liquid crystal display 21, in order for the user to select any one from among various kinds of image data transfer method that will be explained hereinafter. When any one of these transfer methods is selected by the user, processing is started in order to connect the electronic camera 1 and the PC 32 together via the wireless LAN by wireless communication performed between the wireless LAN module unit 24 and the access point 31, based upon the wireless LAN setting information in the profile that has already been selected.

In the processing for connecting together the electronic camera 1 and the PC 32 via the wireless LAN, first the camera information of the electronic camera 1 is transmitted to the PC 32. The PC 32 decides whether or not to permit connection with the electronic camera 1, according as to whether or not the information for the camera is registered in advance. If the camera information that has been transmitted is indeed registered in advance, then connection is permitted and a communication circuit with the electronic camera 1 is established. When a communication circuit via the wireless LAN between the electronic camera 1 and the PC 32 has been established in this manner, thereafter the image data that is recorded in the electronic camera 1 is transferred from the electronic camera 1 to the PC 32 according to the transfer method that was selected upon the wireless LAN menu screen.

On the other hand, if the profile of the printer 42 is selected by the user, then processing is started in order to connect the electronic camera 1 and the printer 42 together via the wireless LAN by wireless communication performed between the wireless LAN module unit 24 and the printer 42, based upon the wireless LAN connection information in the profile. At this time, the processing for connecting the electronic camera 1 to the wireless LAN and the processing for connection to the printer 42 are performed in sequence, and no intermediate display of any wireless LAN menu screen is performed. When a communication circuit via the wireless LAN between the electronic camera 1 and the printer 42 has been established, thereafter printing of the image data is performed by outputting the image data that is recorded in the electronic camera 1 to the printer 42 from the electronic camera 1.

As has been explained above, the electronic camera 1 may be connected to the PC 32 or to the printer 42 via wireless LAN connection. Wireless LAN connection between the electronic camera 1 and the PC 33 may also be performed by a method similar to that for the PC 32.

It should be understood that, if the profile of the printer 34 that is connected to the PC 33 has been selected, then wireless LAN connection processing is performed, and a communication circuit is established between the electronic camera 1 and the PC 33, by a similar sequence to that in the case of the printer 42, described above. When the communication circuit has been established via the wireless LAN between the electronic camera 1 and the PC 33, then thereafter printing of the image data that is recorded upon the electronic camera 1 is performed by the image data being outputted to the printer 34 via the PC 33. By doing this, even if the printer 34 is not one that complies with the PictBridge standard, it is still possible to perform printing from the side of the electronic camera 1 by similar actuation to the case of a printer that does comply with the PictBridge standard.

4. Transferring Image Data

Next, the method will be explained by which the image data is transferred after the electronic camera 1 and the PC 32 have been connected together via the wireless LAN. On the wireless LAN menu screen described above, as the method for transferring the image data, it is possible to select any one of "update transfer", "transfer by day of photography", "marked image transfer", "selected image transfer", and "photographic transfer".

In "update transfer", each of the image files of image data recorded upon the electronic camera 1 is compared with the various image files of image data that are recorded upon the PC 32, and only those image files that are not recorded upon the PC 32 are transferred. By doing this, only image files that have not yet been transferred to the PC 32 are transferred. It should be understood that in "update transfer", since a list of the image files that are recorded upon the electronic camera 1 is transferred to the PC 32 before transferring of the image files, PC 32 can determine the difference between the image files upon the electronic camera 1 and the image files upon the PC 32. The PC 32 requests electronic camera 1 to transmit the determined difference of the image files.

In "transfer by day of photography", from among the various image files of image data that are recorded upon the electronic camera 1, only those image files that were created upon a day of photography selected by the user are transferred to the PC 32. At this time, irrespective of whether or not the image files upon the day of photography that has been selected are already recorded upon the PC 32, the corresponding image files are all transferred. In case that "transfer by day of photography" has been selected, when the electronic camera 1 and the PC 32 are connected together via the wireless LAN, a selection screen for the day of photography is displayed upon the liquid crystal display 21, and the image files for the day of photography that has been selected upon this screen are transferred.

In "marked image transfer", from among the various image files of image data that are recorded upon the electronic camera 1, only those image files for which a transfer mark is set in advance are transferred to the PC 32. At this time, irrespective of whether or not the image files for which the transfer mark is set are already recorded upon the PC 32, all of the corresponding image files are transferred. It should be understood that it is possible for the user to set this transfer mark as desired, before connecting together the electronic camera 1 and the PC 32 via the wireless LAN.

In "selected image transfer", from among the various image files of image data that are recorded upon the electronic camera 1, the image files to be transferred are selected by the user, and only those image files are transferred to the PC 32. At this time, irrespective of whether or not the image files that have been selected are already recorded upon the PC 32, the corresponding image files are all transferred. If "selected image transfer" has been selected, then, when the electronic camera 1 and the PC 32 are connected together via the wireless LAN, a selection screen for the images that have been photographed is displayed upon the liquid crystal display 21, and the image files that have been selected upon this screen are transferred.

In "photographic transfer", an image file that has been photographed by the electronic camera 1 is transferred to the PC 32 directly after it has been photographed. In this photographic transmission, when photography is performed, the image that has been photographed is displayed upon the liquid crystal display 21, and a query is made as to whether or not it should be transmitted. If the user responds to the query that it should be transmitted, then the image file that has been photographed is transmitted to the PC 32. It should be understood that it is possible to set in advance whether or not the image file that has been transferred should be recorded upon the memory card 30.

When transferring image data according to any one of the transfer methods described above, a command file with the title "ADVTRANS.MRK" is created upon the electronic camera 1, and is transmitted to the PC 32. In the command file, information that is required for transferring the image data to the PC 32 according to the transfer method that has been selected is recorded using various types of parameter that have been set in advance. It should be understood that this command file is created by using the portion of standard vendor extended region provided in the standard called DPOF (Digital Print Order Format).

FIG. 7 is a table showing the details of the parameters that are used for the above described command file "ADVTRANS.MRK". In this table, the title of each parameter that is used, its meaning, and the values that this parameter can take are shown.

FIG. 8 is a figure showing examples of command files that have been created using the parameters of FIG. 7. (1) shows an example of a command file when no list of image files is created by the electronic camera 1. When "update transfer" or the like is selected as the transfer method for the image data, a command file having this kind of contents is created. (2) shows an example of a command file when a list of image files is created by the electronic camera 1. When "marked image transfer" or "selected image transfer" or the like is selected as the transfer method for the image data, a command file having this kind of contents is created. In this command file (2), the number of corresponding image files and their path name (s) are displayed in a list in order using the parameters "IMG QTY" and "IMAGE SRC".

Figure 9:
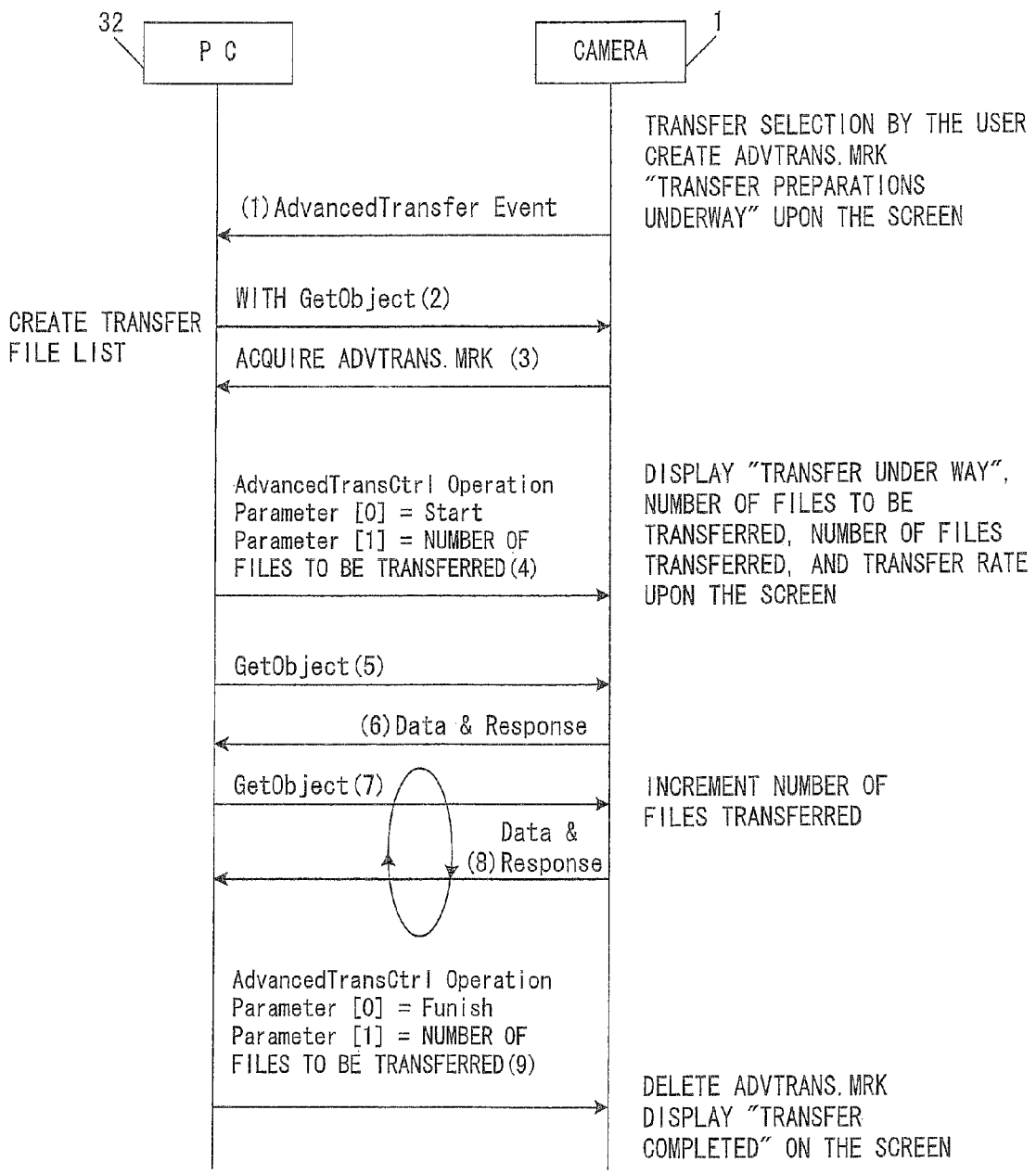
FIG. 9 is a figure showing a processing sequence when "update transfer" has been selected as the transfer method for image data.

FIG. 9 shows the processing sequence when "update transfer" has been selected as the transfer method for the image data, as an example of a processing sequence when transferring image data from the electronic camera 1 to the PC 32. After the command file "ADVTRANS.MRK" has been created according to the transfer method for the image data that has been selected, the electronic cameral notifies the PC 32 with an AdvancedTransferEvent command (1) that this command file has been created. Upon receiving this notification, the PC 32 requests the command file from the electronic camera 1 with a GetObject command (2). In response to this request, the electronic camera 1 transmits the command file "ADVTRANS.MRK" that has been created to the PC 32, as in (3). In this manner, the command file is acquired by the PC 32.

The PC 32 creates the list of image files to be transferred based upon the command file that it has acquired. When this list of image files to be transferred has been created, the number of these image files is transmitted to the electronic camera 1 with an AdvancedTransferCtrlOpereation command (4). At this time, a display of "transferring", the number of image files to be transferred, the number of image files that have been transferred, and the transfer rate are displayed upon the liquid crystal display 21 of the electronic camera 1. The transfer rate is calculated each second as the average value of the transfer rate for the ten seconds directly before.

Thereafter, with a GetObject command (5), the PC 32 requests the electronic camera 1 for the first image file. In response to this request, the electronic camera 1 returns a response and the corresponding image file to the PC 32 with a Data & Response command (6). Next, with a GetObject command (7), the PC 32 requests the electronic camera 1 for the next image file. In response to this request, the electronic camera 1 returns a response and the corresponding image file to the PC 32 with a Data & Response command (8). By repeating this, the designated image files are transferred in order from the electronic camera 1 to the PC 32. It should be understood that, during this time, the displayed detail of the number of image files that have been transferred is incremented upon the liquid crystal display 21 of the electronic camera 1 according to the number of image files for which the transfer to the PC 32 has been completed.

When the transfer of all of the image files has ended, a notification to which effect is issued from the PC 32 to the electronic camera 1 with an AdvancedTransferCtrlOperation command (9). In response to this, the electronic camera 1 deletes the command file "ADVTRANS.MRK" that it had created, and displays the message "transfer completed" upon the screen of the liquid crystal display 21. It should be understood that it would also be possible, upon actuation by the user, for the transfer to be cancelled partway through, provided that this is done before the "transfer completed" message is displayed. With the processing sequence as explained above, the image data is transferred from the electronic camera 1 to the PC 32.

Figure 10:
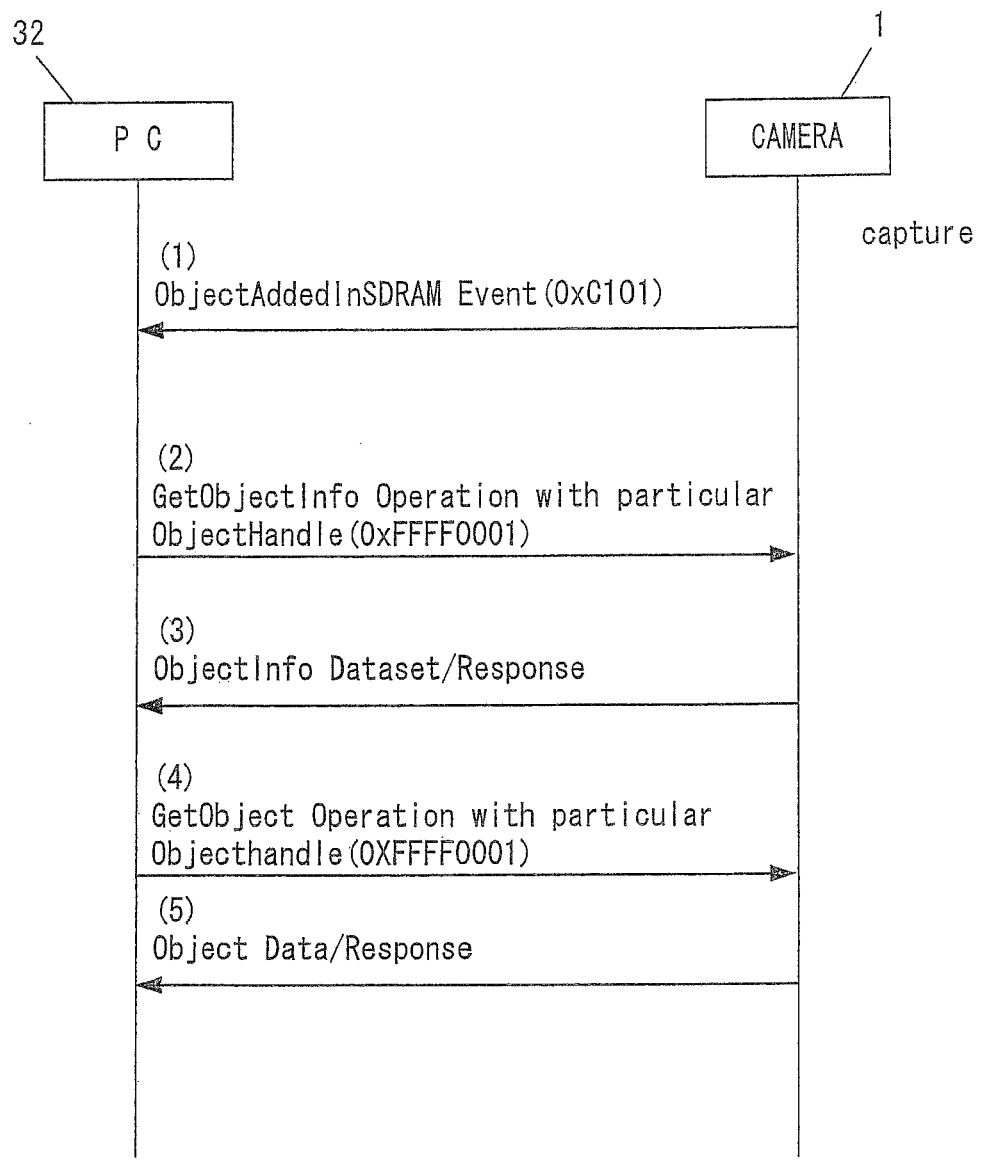
FIG. 10 is a figure showing a processing sequence when, with a setting not to record transferred image files upon a memory card, "photographic transfer" has been selected as the transfer method for image data.

FIG. 10 shows the processing sequence when "photographic transfer" has been selected as the transfer method for the image data, in the state in which it is set not to record the transferred image files upon the memory card 30. In this case, when photography is performed with the electronic camera 1, a notification is issued from the electronic camera 1 to the PC 32 with an ObjectAddedInSDRAM Event command (1). Upon receipt of this notification, the PC 32 requests the electronic camera 1 to transmit information related to the image file that has been photographed with a GetObjectInfoOperation with particular ObjectHandle command (2). And, in response to this request, the electronic camera 1 transmits to the PC 32 information related to the image file that has been photographed with an ObjectInfo Dataset/Response command (3).

When the information for the image file that has been photographed is received, the PC 32 requests the electronic camera 1 for this image file with a GetObject Operation with particular DataHandle command (4). And, in response to this request, the electronic camera 1 returns the image file that has been photographed to the PC 32 with an Object Data/Response command (5). This image file is not recorded upon the memory card 30. By a processing sequence like that explained above, the image data is transferred from the electronic camera 1 to the PC 32.

Figure 11:
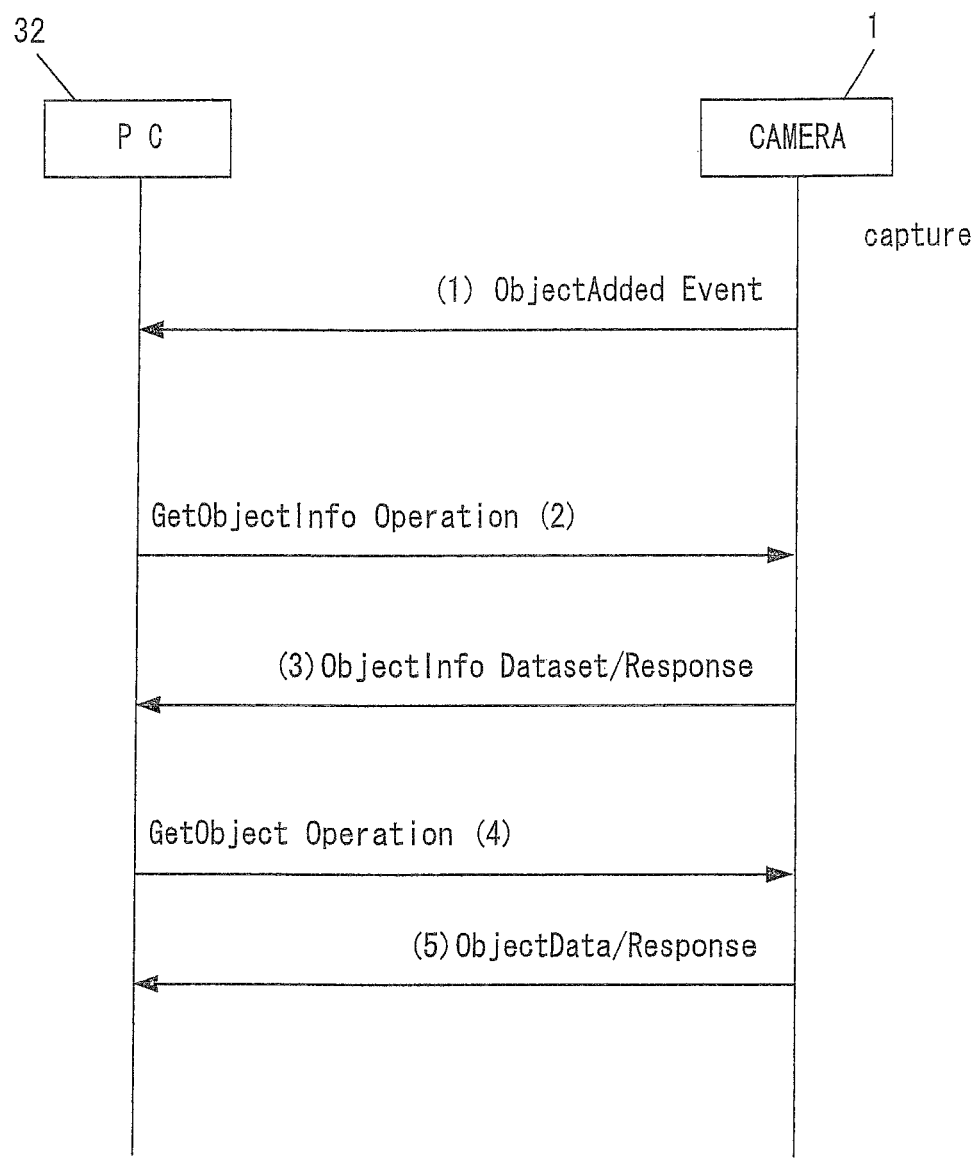
FIG. 11 is a figure a processing sequence when, with a setting to record transferred image files upon the memory card, "photographic transfer" has been selected as the transfer method for image data.

FIG. 11 shows the processing sequence when "photographic transfer" has been selected as the transfer method for the image data, and it is set to record the transferred image files upon the memory card 30. In this case, when photography is performed with the electronic camera 1, a notification is issued from the electronic camera 1 to the PC 32 with an ObjectAdded Event command (1). Upon receipt of this notification, the PC 32 requests the electronic camera 1 to transmit information related to the image file that has been photographed with a GetObjectInfoOperation command (2). In response to this request, the electronic camera 1 transmits to the PC 32 information related to the image file that has been photographed with an ObjectInfo Dataset/Response command (3), in a similar manner to the case in FIG. 10.

When the information for the image file that has been photographed is received, the PC 32 requests the electronic camera 1 for this image file with a GetObject Operation command (4). In response to this request, the electronic camera 1 returns the image file that has been photographed to the PC 32 with an Object Data/Response command (5), in a similar manner to the case in FIG. 10. This image file is recorded upon the memory card 30 after having been transferred to the PC 32. By a processing sequence like that explained above, the image data is transferred from the electronic camera 1 to the PC 32.

As has been explained above, the image data is transferred from the electronic camera 1 to the PC 32 that is connected thereto by a wireless LAN. It should be understood that the transfer of the image data from the electronic camera 1 to the PC 33 is also performed by a similar method to that in the case of the PC 32.

With "update transfer" or "marked image transfer", when the transfer of all of the corresponding image files to the PC 32 has been completed, supply of electrical power from the battery 4 to the wireless LAN module unit 24 is prohibited by the control unit 17, and the electronic camera 1 returns to the profile selection screen. Due to this, it is possible to prevent useless battery consumption. With "transfer by day of photography" and "selected image transfer", when transfer to the PC 32 of all of the image files that were selected by the user has been completed, the electronic camera 1 returns to the day of photography selection screen or to the image selection screen. When on this selection screen a different day of photography or a different image (s) is selected, then transfer of the corresponding image file (s) is started. With "photographic transfer", when transfer of the image file that has been photographed is completed, the electronic camera 1 returns to the photography screen. And, with "transfer by day of photography" or "selected image transfer" or "photographic transfer", even when the transfer of the image files) is completed, supply of electrical power from the battery 4 to the wireless LAN module unit 24 is continued until cancellation actuation is performed by the user.

It should be understood that, if due to a problem upon the wireless transmission path the wireless LAN communication is cut off partway through, then the message "transfer error" is displayed upon the liquid crystal display 21 of the electronic camera 1, and the transfer of the image data is interrupted. In this case, the user is invited to select whether or not to continue with the transfer. If continuation is selected, then error recovery is started by performing reconnection to the wireless LAN and transfer resumption processing, and the transfer of the image data that was interrupted is resumed.

Furthermore, if the voltage of the battery 4 has decreased to less than or equal to a predetermined value during the transfer of image data, the message "no power remaining in the battery/transfer interrupted" is displayed upon the liquid crystal display 21 of the electronic camera 1 and the transfer of the image data is interrupted. After a predetermined time period from the interruption of the transfer, the power supply of the electronic camera 1 is turned OFF. In this case when, after having ensured the required operating electrical power by changing the battery 4 or by connecting an AC adapter, the power supply to the electronic camera 1 is turned ON and the mode dial is set to the position "wireless LAN", then the user is invited to select whether or not to continue the interrupted transfer of the image data. If continuation is selected, then error recovery is started by performing reconnection to the wireless LAN and transfer resumption processing in a manner similar to that described above, and the transfer of the image data that was interrupted is resumed.

If the transfer of the image data is interrupted as described above, then, as transfer interruption information, the number of the profile that was selected at that time and the number of image files for which transfer had been completed up to when the interruption occurred are recorded in the memory 18 of the electronic camera 1. The error recovery is executed by reconnection to the wireless LAN and transfer resumption of the image data being performed based upon this transfer interruption information. It should be understood that the transfer interruption information is cleared when setting of the profile is performed, or when removal or insertion of the memory card 30 is performed.

When the mode dial of the electronic camera 1 is set to the "wireless LAN" position, a decision is made as to whether or not the command file "ADVTRANS.MRK" exists in the electronic camera 1. When all of the corresponding image files are transferred, then as previously described the command file "ADVTRANS.MRK" is deleted. Accordingly, if the command file "ADVTRANS.MRK" exists, then it can be decided that the transfer of the image data has been interrupted. Due to this, it is possible to detect the occurrence of an interruption due to the voltage of the battery 4 having decreased and the power supply of the electronic camera 1 having gone to OFF, when next the power supply of the electronic camera 1 is turned ON.

5. The Wireless LAN Sleep Modes

Next, the operation of wireless LAN sleep modes that are executed by the electronic camera 1 will be explained. If no actuation input has been performed by the user for a predetermined time period or greater, for example three minutes, then, under the control of the control unit 17, the electronic camera 1 transits to a sleep mode in which a portion of its operation is stopped to suppress useless battery consumption. Two types of sleep mode exist. One type is termed the normal sleep mode to which transition takes place when supply of electrical power from the battery 4 to the wireless LAN module unit 24 is to be prohibited. In the normal sleep mode, the operational state at this time point is stored and the operation is continued of a unit for performing detection of actuation input, for example the control unit 17 or the like, while the supply of electrical power is stopped to the other units, for example to the liquid crystal display 21, the image sensor 8, the image processing unit 15 and the like, so that their operation is stopped. In the normal sleep mode, supply of electrical power to the wireless LAN module unit 24 is not performed.

During the normal sleep mode, if no actuation input is performed by the user for a further predetermined time period, for example three minutes, then an auto power OFF function operates, and the supply of power to the electronic camera 1 is automatically turned OFF. This auto power OFF function is implemented by the control unit 17. If during the normal sleep mode actuation from the user is detected, then the supply of electrical power to the various sections whose operation was stopped is resumed, and the system returns to its operational state before sleeping.

Another sleep mode is a so called wireless LAN sleep mode that is established when supply of electrical power to the wireless LAN module unit 24 is to be permitted. In this wireless LAN sleep mode, the supply of electrical power to the wireless LAN module unit 24 continues to be performed, while, in a similar manner to the case for the normal sleep mode, the supply of electrical power to, for example, the liquid crystal display 21 and the like is stopped, so that operation thereof is stopped. Thus, the supply of electrical power to the wireless LAN module unit 24 is performed in this wireless LAN sleep mode.

As has been explained above, in case that the supply of electrical power from the battery 4 to the wireless LAN module unit 24 is to be prohibited, the normal sleep mode is established so as to stop the operation of certain sections including the wireless LAN module unit 24. Conversely, incase that the supply of electrical power from the battery 4 to the wireless LAN module unit 24 is to be permitted, the wireless LAN sleep mode is established so as to stop the operation of certain sections excluding the wireless LAN module unit 24. In other words, even if transition takes place to one of the sleep modes, the state of supply of electrical power from the battery 4 to the wireless LAN module unit 24 is maintained, while stopping the operation of certain sections of the electronic camera 1. By doing this, it is possible to suppress useless battery consumption by stopping the supply of electrical power to sections that are not required, even when the captured image data is being transmitted by the wireless LAN module unit 24.

It should be understood that, during the wireless LAN sleep mode, the auto power OFF function is prohibited in order not to turn the supply of power to the electronic camera 1 OFF automatically, even if the predetermined time period elapses in the state in which actuation input by the user is not performed. Due to this, automatic turning OFF of the power supply to the electronic camera 1 by the operation of the auto power OFF function during transfer of image data is prevented, and undesirable interruption of the transfer of image data thereby is prevented.

When the transfer of the image data under the wireless LAN sleep mode is completed, supply of electrical power to the wireless LAN module unit 24 is stopped as previously described. If from this time point, no actuation input by the user is performed over a fixed time period, then the electronic camera 1 transits from the wireless LAN sleep mode to the normal sleep mode. Thereafter, no actuation input from the user is performed for a predetermined time period, the auto power OFF function operates as previously described and supply of electrical power to the electronic camera 1 is automatically turned OFF. If input from any one of the switches is detected during the wireless LAN sleep mode, then, in a similar manner to the case in the normal sleep mode, the supply of power to the various sections is resumed, and the system returns to its operation state before sleeping.

Now, when the transfer of image data under the wireless LAN sleep mode finishes and the supply of power to the electronic camera 1 is turned OFF automatically after transition to the normal sleep mode, then it is not possible for the user to confirm that the transfer of the image data has been completed, since there is no opportunity for any "transfer completed" message to be displayed upon the screen of the liquid crystal display 21 as previously described. Accordingly, when the power supply to the electronic camera 1 is next turned ON, a message indicating that the image transfer during the wireless LAN sleep mode was completed is displayed upon the screen of the liquid crystal display 21, so that the user is notified of completion of image transfer. It should be understood that it would also be acceptable to arrange not to provide this type of display directly after the power supply to the electronic camera 1 is turned ON, but to provide it when the wireless LAN mode is selected.

The concrete method for displaying a message like the one described above will now be explained. When the transfer of the image data by the electronic camera 1 is completed, flag information consisting of a so called transmission end indicator flag is set internally. This transmission end indicator flag is stored even when the supply of power to the electronic camera 1 is turned OFF. And, when next the operational mode of the electronic camera 1 is changed over to the wireless LAN mode, if the transmission end indicator flag is set, the message "transfer was completed" is displayed upon the screen of the liquid crystal display 21 for a predetermined time period, for example for two seconds. When this message is displayed, or when a "transfer completed" message is displayed without transition to the wireless LAN sleep mode, the transmission end indicator flag having been set is cancelled. By doing this, even if the electronic camera 1 transits from the wireless LAN sleep mode to the normal sleep mode and then the supply of power to the electronic camera 1 is turned OFF automatically, it is still possible for the user to confirm that the transfer of the image data was completed when the wireless LAN mode is established again.

It should be understood that whether the state of supply of electrical power from the battery 4 to the wireless LAN module unit 24 is permitted, or is prohibited, is decided according to the operational state of the electronic camera 1, in other words according to which menu item is selected in the wireless LAN mode. As explained earlier, the supply of electrical power to the wireless LAN module unit 24 is permitted during the time period from when a transfer method for the image data (in the case of connection to a PC) or a profile (in the case of connection to a printer) has been selected by the user, until the transfer of the designated image data is completed or is interrupted. Accordingly, the wireless LAN sleep mode is established during the time period, while the normal sleep mode is established for another time period. With regard to the concrete change over timing between the wireless LAN sleep mode and the normal sleep mode, this is shown in the menu transition figures of FIGS. 13 through 18 for the wireless LAN mode that will be explained hereinafter.

6. The Power Save Mode

Next, the change over of the electronic camera 1 to the power save mode will be explained. When the supply of electrical power to the wireless LAN module unit 24 is permitted, the so called power save mode function in the electronic camera 1 is automatically turned ON or OFF. It is possible to reduce the battery consumption while the power save mode is turned ON. The ON/OFF changeover of this power save mode is performed under the control of the control unit 17. As explained below, the operation of the wireless LAN module unit 24 is varied depending on the power save mode being ON or OFF.

While the electronic camera 1 is connected via a wireless LAN to the PC 32 or 33 or to the printer 42, transmission and reception of radio waves is performed between the wireless LAN module unit 24 and the access point 31 or the printer dongle 41 at a timing according to the timing of input and output of communication data. This transmission and reception timing of the radio waves is not fixed. Accordingly, in order to ensure that it is possible for the radio waves that are transmitted from the access point 31 or from the printer dongle 41 to be received by the wireless LAN module unit 24 at any time, it is necessary for the wireless LAN module unit 24 to be operated in the standby state when radio wave transmission is not being performed. This kind of operation is performed when the power save mode is OFF.

On the other hand, when the power save mode is changed over to ON, communication data to the wireless LAN module unit 24 is temporarily stored in the access point 31 or in the printer dangle 41. And querying (polling) of the access point 31 or the printer dangle 41 for the presence or absence of communication data is performed from the wireless LAN module unit 24 repeatedly at a predetermined cycle that is determined in advance. If communication data is stored, the stored communication data is received, while if no such data is stored, then the system waits for the next time for polling. Apart from this polling, the wireless LAN module unit 24 is not operated in the standby state. Through the above process, in case that the power save mode is ON, it is possible to keep down the battery consumption by stopping the operation of the wireless LAN module unit 24 when transmission of radio waves is not being performed.

However, the wireless LAN communication is performed at a certain polling interval and not performed at any other timing when the power save mode is turned ON. Therefore the throughput of communication is reduced, as compared to the case when the power save mode is OFF. Accordingly, when high throughput is required, for example, when transferring captured image data, the electronic camera 1 changes over the power save mode to OFF. If this is not the case, for example when the wireless LAN menu screen is being displayed upon the liquid crystal display 21, or when the transfer of the image files that have been selected by the user has finished in the mode of "transfer by day of photography" or "selected image transfer", or the like, the electronic camera 1 changes over the power save mode to ON to suppress useless consumption of the battery. This type of changing over of the power save mode between ON and OFF is performed according to the operational state of the electronic camera 1, in other words according to which menu item for the wireless LAN mode is selected. The concrete details of the ON/OFF timing for the power save mode are shown in the menu transition figures FIG. 13 through FIG. 18 for the wireless LAN mode that will be explained hereinafter.

It should be understood that it is also possible to use various types of method in order to keep down the battery consumption of the electronic camera 1, other than the power save mode as explained above. For example, although normally extension of the photographic lens is performed when the power supply to the electronic camera 1 is turned ON, it may be arranged not to perform extension of the photographic lens, when the power supply is turned ON with the mode dial being set to the wireless LAN position. Furthermore, when the power supply to the electronic camera 1 is ON with the mode dial being set to the wireless LAN position, further driving of the photographic lens may be prevented. By doing this, it is possible to prevent useless battery consumption entailed by unnecessary driving of the photographic lens during the wireless LAN mode. It should be understood that, if the method "photographic transfer" described above is selected as the transfer method for the image data during the wireless LAN mode, the photographic lens is driven and the electronic camera 1 is put into the state of being capable of photography.

As yet another method, when operating in the wireless LAN mode, it may be arranged not to receive any actuation input due to the replay button of the actuation unit 16, so that display of any replay image is prohibited. By doing this, it is possible to prevent unnecessary transmission and reception of radio waves by the wireless LAN module unit 24 from being performed during display of a replay image, so that it is possible to prevent the battery from being uselessly consumed thereby.

7. Battery Checking

Next, the method of battery checking with the electronic camera 1 will be explained. The electronic camera 1 is endowed with a battery check function in which the remaining capacity of the battery 4 is checked. This battery check function is performed by detecting the output voltage of the battery 4 (i.e. the battery voltage) with the battery voltage detection unit 5. If the battery voltage is less than or equal to a predetermined threshold value, then it is decided that the battery remaining capacity has become insufficient, and a warning is issued to the user for notifying him to that effect, by displaying upon the liquid crystal display 21 a mark (a half mark) that shows that the battery remaining capacity has decreased. At this time, according to requirements, some portion of the operation of the electronic camera 1 may be prohibited.

Furthermore, if the electronic camera 1 is operating in the wireless LAN mode, then the battery check is performed by a different method, from when it is operating in some other operational mode (the photographic mode, the replay mode, or the like). The method will now be explained below in concrete terms.

If the electronic camera 1 is operating in the wireless LAN mode, when data is wirelessly transmitted from the wireless LAN module unit 24, the battery voltage temporarily decreases during transmission, due to the load imposed by this wireless transmission. The width of the voltage decrease at this time is large as compared with when other operations are performed by the electronic camera 1. Due to this, even if actually there is still some leeway in the battery remaining capacity, sometimes the half mark undesirably mistakenly comes to be displayed, due to the battery voltage, that has decreased during wireless transmission, temporarily dropping below the threshold value for battery checking. Thus, in order to prevent this type of erroneous display of the half mark, a lower threshold value is set for performing battery checking when the wireless LAN mode is operating, than during the other operational modes.

Figure 12:
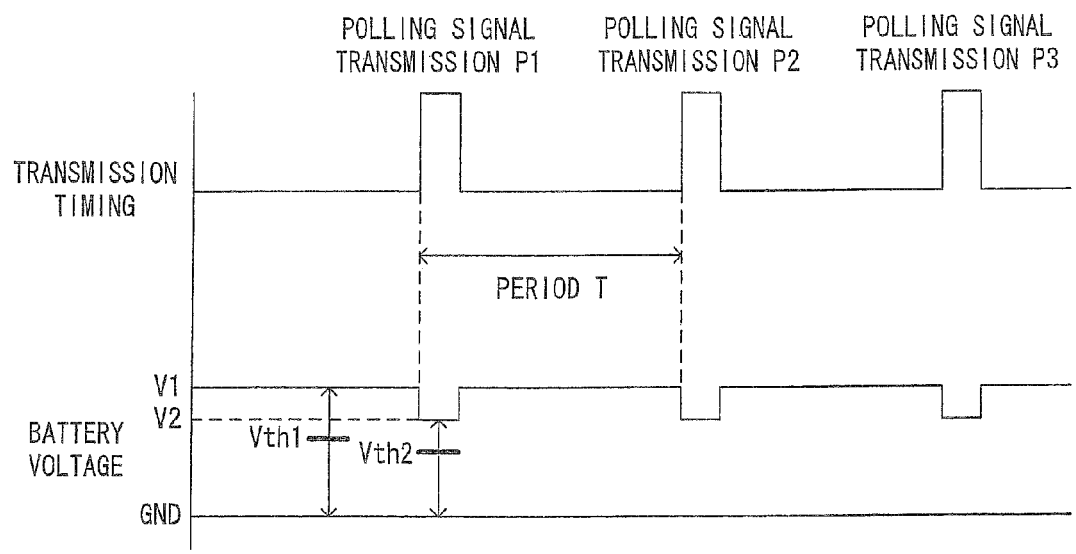
FIG. 12 is a figure showing a situation in which the threshold value for battery checking is changed during the wireless LAN mode.

A situation in which the threshold value for battery checking is changed during the wireless LAN mode is shown in FIG. 12. The upper graph shows the timing of wireless transmission from the wireless LAN module unit 24, and the lower graph shows the change of battery voltage. It should be understood that, in the upper wireless transmission timing, the case is shown in which the power save mode as described above is set to ON, so that polling transmission is performed from the wireless LAN module unit 24 upon a cycle of period T. As will be understood from this figure, during wireless transmission from the wireless LAN module unit 24, the battery voltage decreases from V1 to V2. It should be understood that these voltages V1 and V2 are supposed to mean the battery voltages that are detected when the battery 4 is in the fully charged state.

In FIG. 12, the threshold value Vth1 shows the threshold value for battery checking in operational modes other than the wireless LAN mode. This threshold value Vth1 is set to a predetermined proportion of the previously described voltage value V1, for example to a value of 70% thereof. In operational modes other than the wireless LAN mode, the half mark is displayed when the detected value of the battery voltage drops below the threshold value Vth1.

And the threshold value Vth2 shows the threshold value for battery checking in the wireless LAN mode. The value of the threshold value Vth2 is set so that the ratio between the threshold value Vth2 and the voltage value V2 becomes the same as the proportion between the threshold value Vth1 and the voltage value V1. In other words, if as described above the threshold value Vth1 is set to 70% of V1, then the threshold value Vth2 is set to 70% of V2. In the wireless LAN mode, the half mark is displayed when the detected value of the battery voltage drops below the threshold value Vth2. By using this threshold value Vth2 for battery checking in the wireless LAN mode, it is possible to change the threshold value for battery checking so that it is smaller than during operational modes other than the wireless LAN mode. By doing this, it is possible to prevent erroneous display of the half mark during the wireless LAN mode.

It should be understood that, if during the wireless LAN mode the battery voltage drops below the threshold value Vth2 and the half mark is displayed, then further transfer of image data is prohibited. By doing this, exhaustion of the remaining capacity of the battery part way through transfer of the image data is prevented. If the battery voltage drops below the threshold value Vth2 part way through the transfer of the image data from the electronic camera 1, then the electronic camera 1 transits to cutting off processing after the packet that is currently being transmitted has been transmitted, and the image transfer is interrupted.

The setting method described above for the threshold values Vth1 and Vth2 is one example thereof; it would also be acceptable to arrange to set these threshold values by some other method. It would be acceptable to arrange to change the threshold value for battery checking by any type of method, provided that the threshold value Vth2 during the wireless LAN mode becomes smaller than the threshold value Vth1 during operational modes other than the wireless LAN mode.

8. Menu Transition

Figure 13:
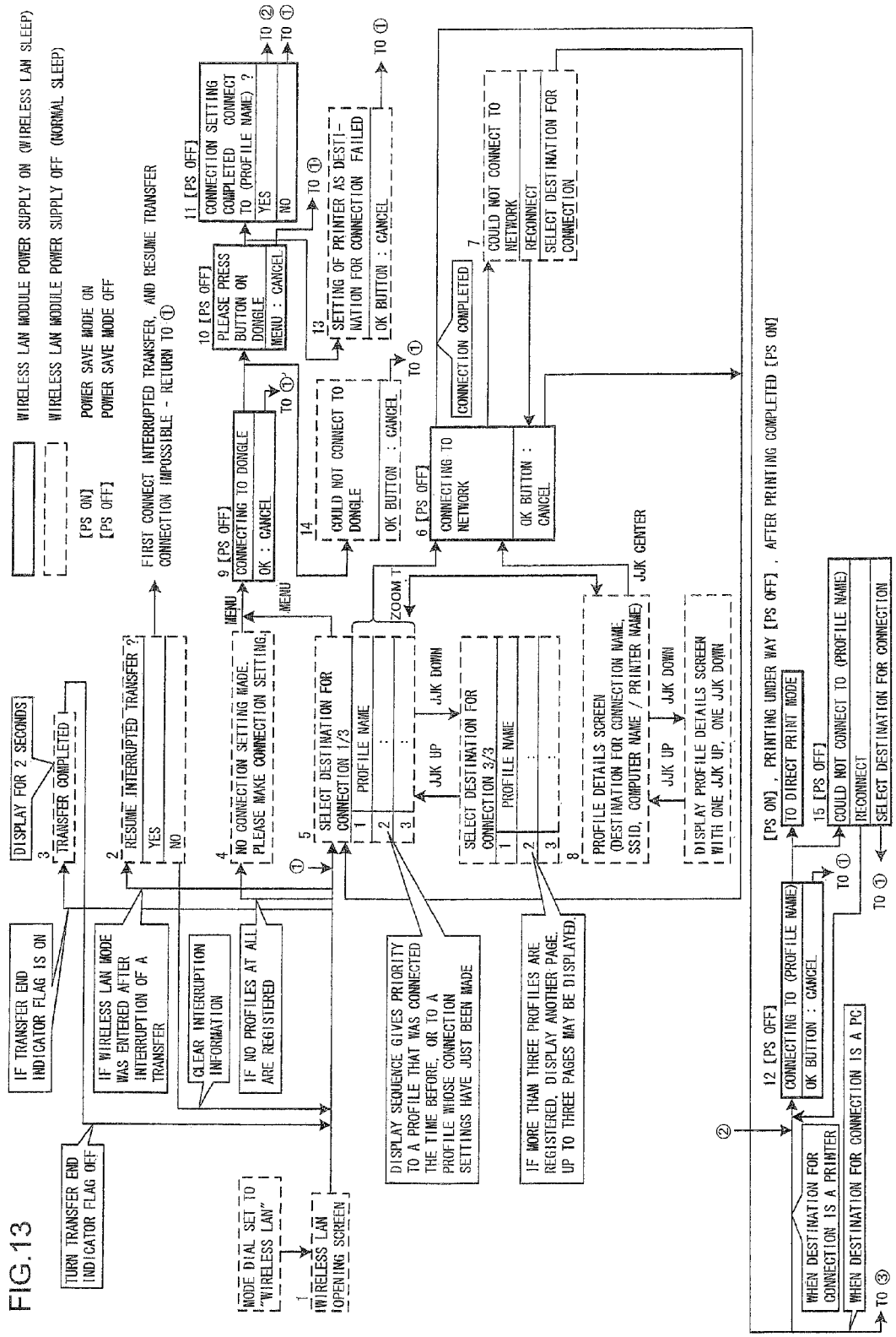
FIG. 13 is a menu transition figure from changeover to the wireless LAN mode, until some transfer method for image data is selected upon a wireless LAN menu screen.
Figure 14:
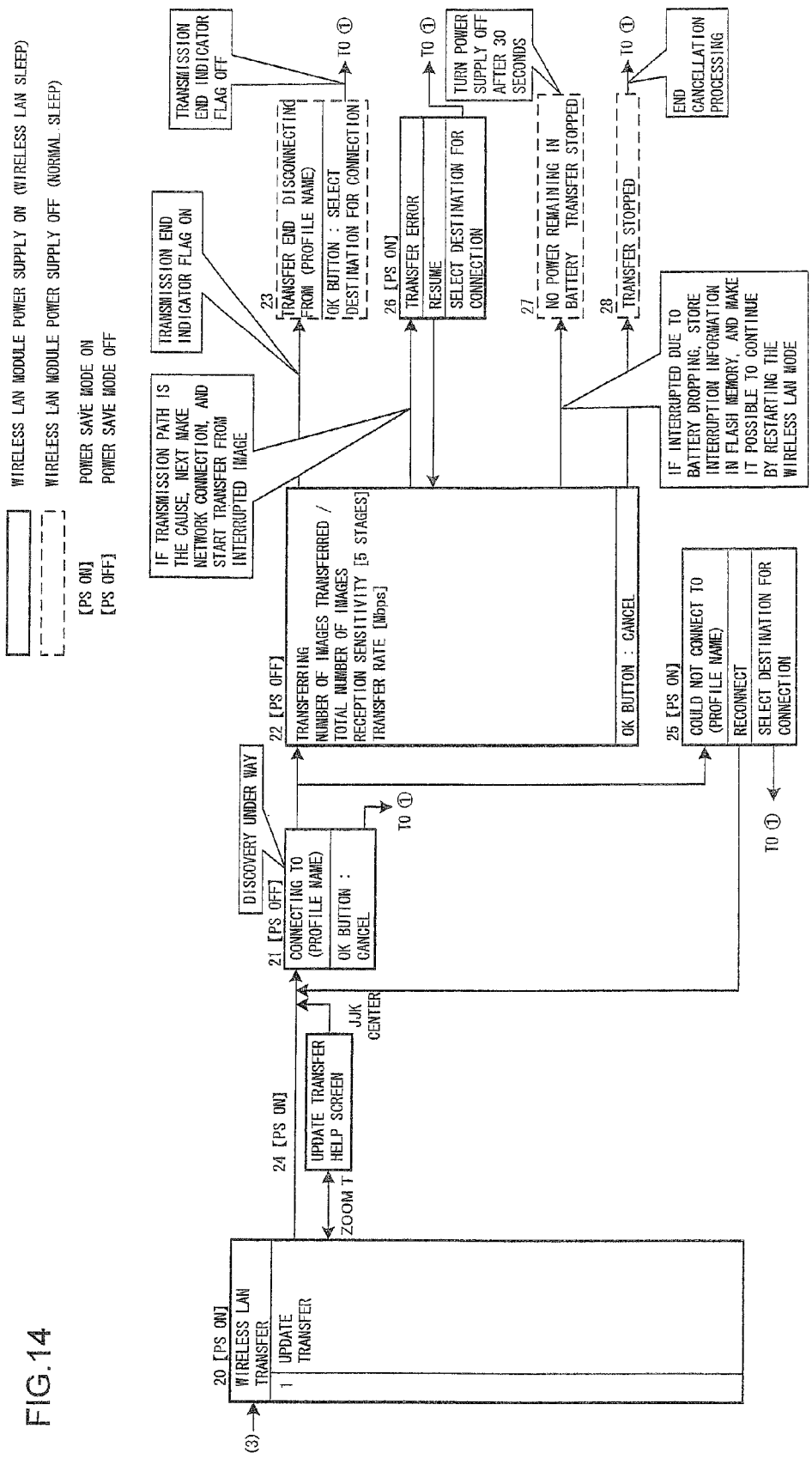
FIG. 14 is a menu transition figure when "update transfer" has been selected.
Figure 15:
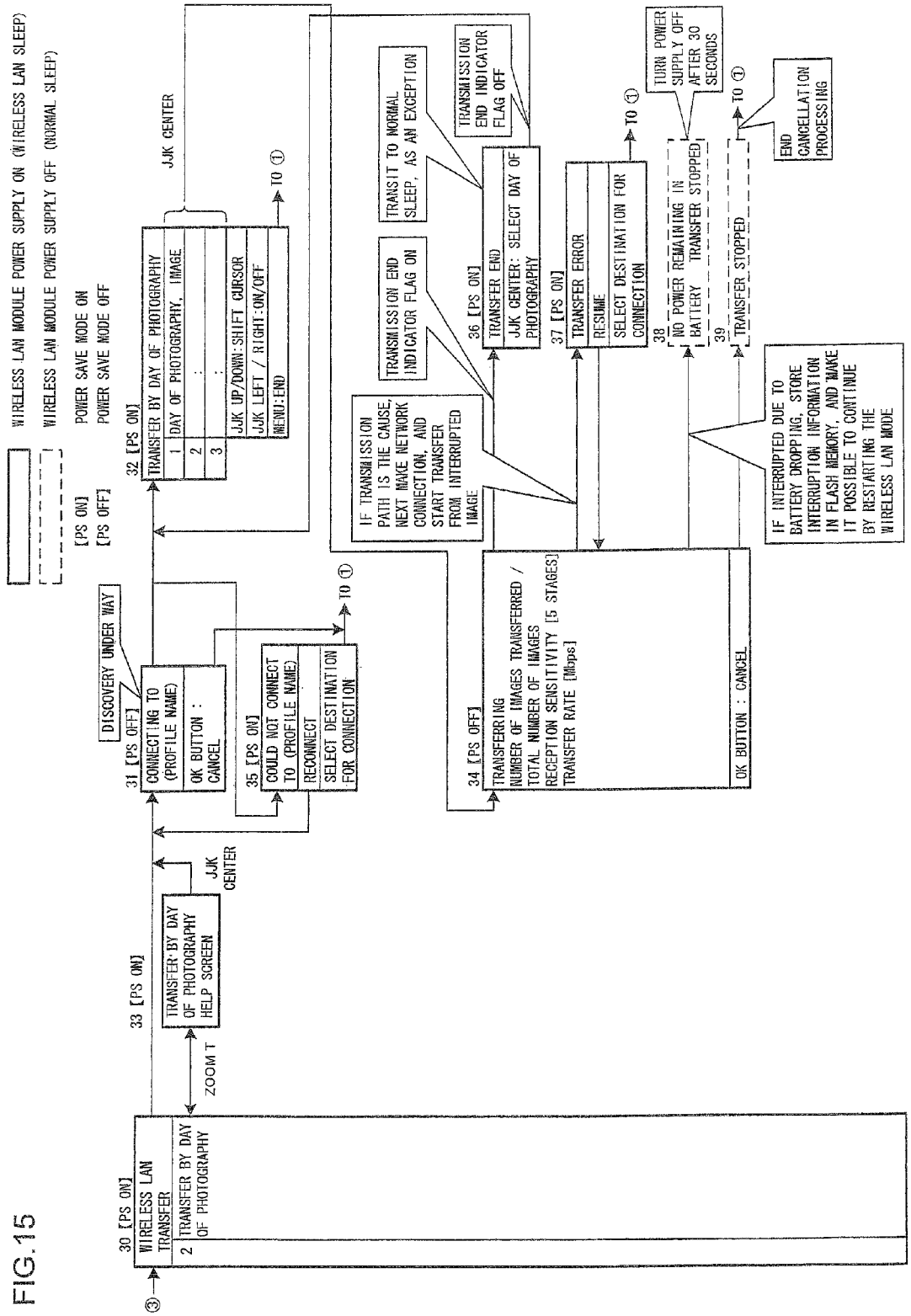
FIG. 15 is a menu transition figure when "transfer by day of photography" has been selected.
Figure 16:
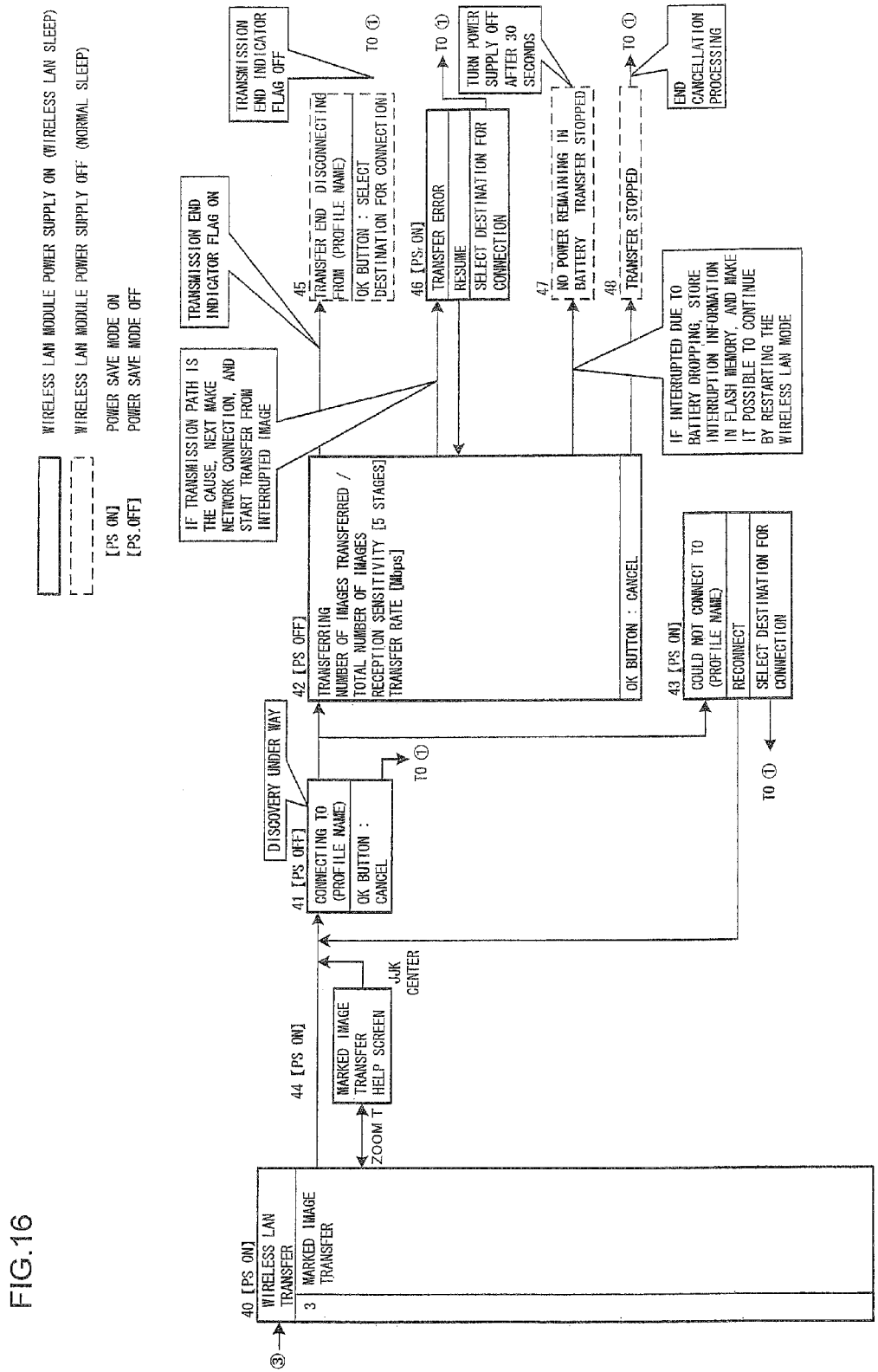
FIG. 16 is a menu transition figure when "marked image transfer" has been selected.
Figure 17:
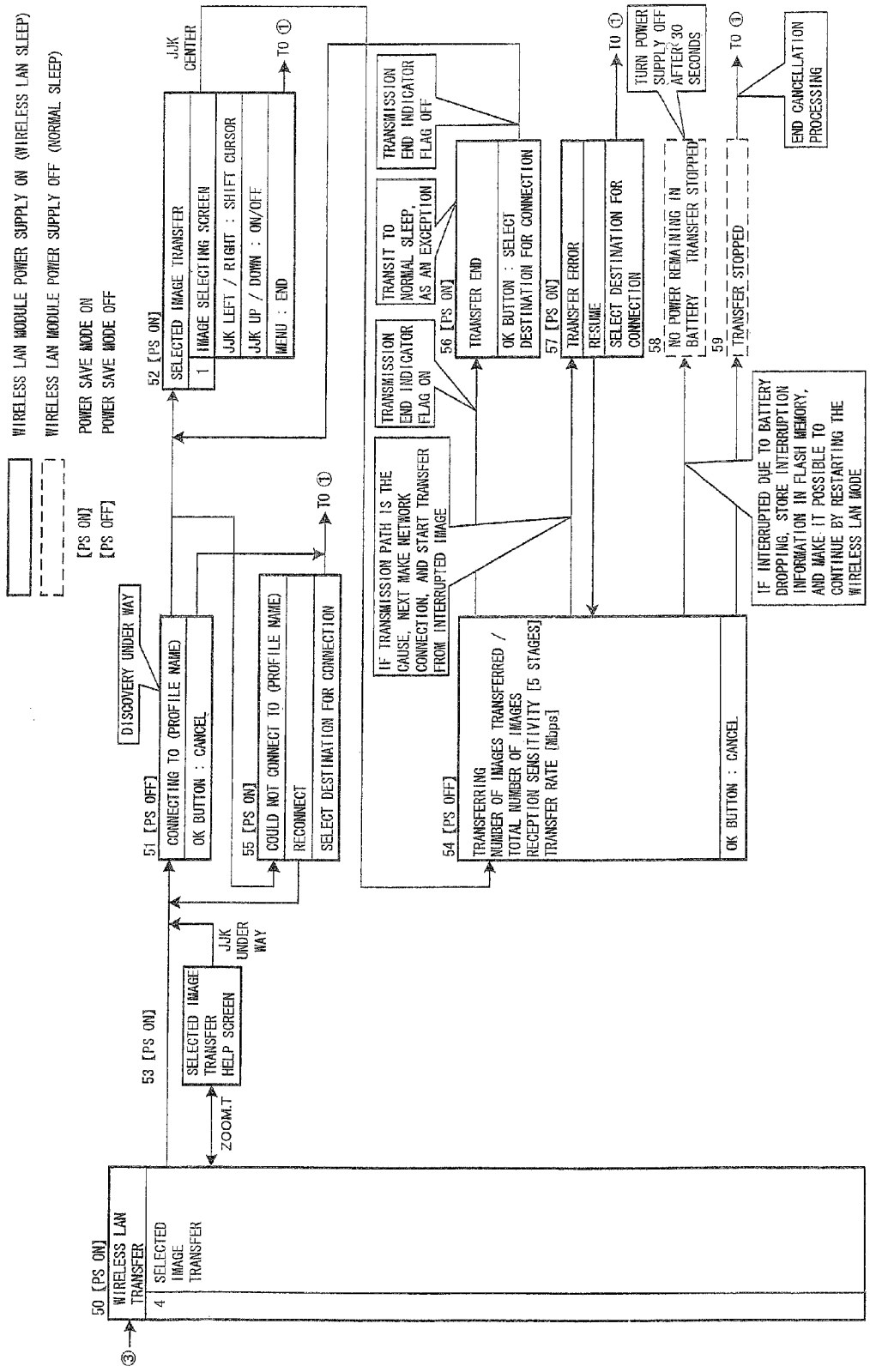
FIG. 17 is a menu transition figure when "selected image transfer" has been selected.
Figure 18:
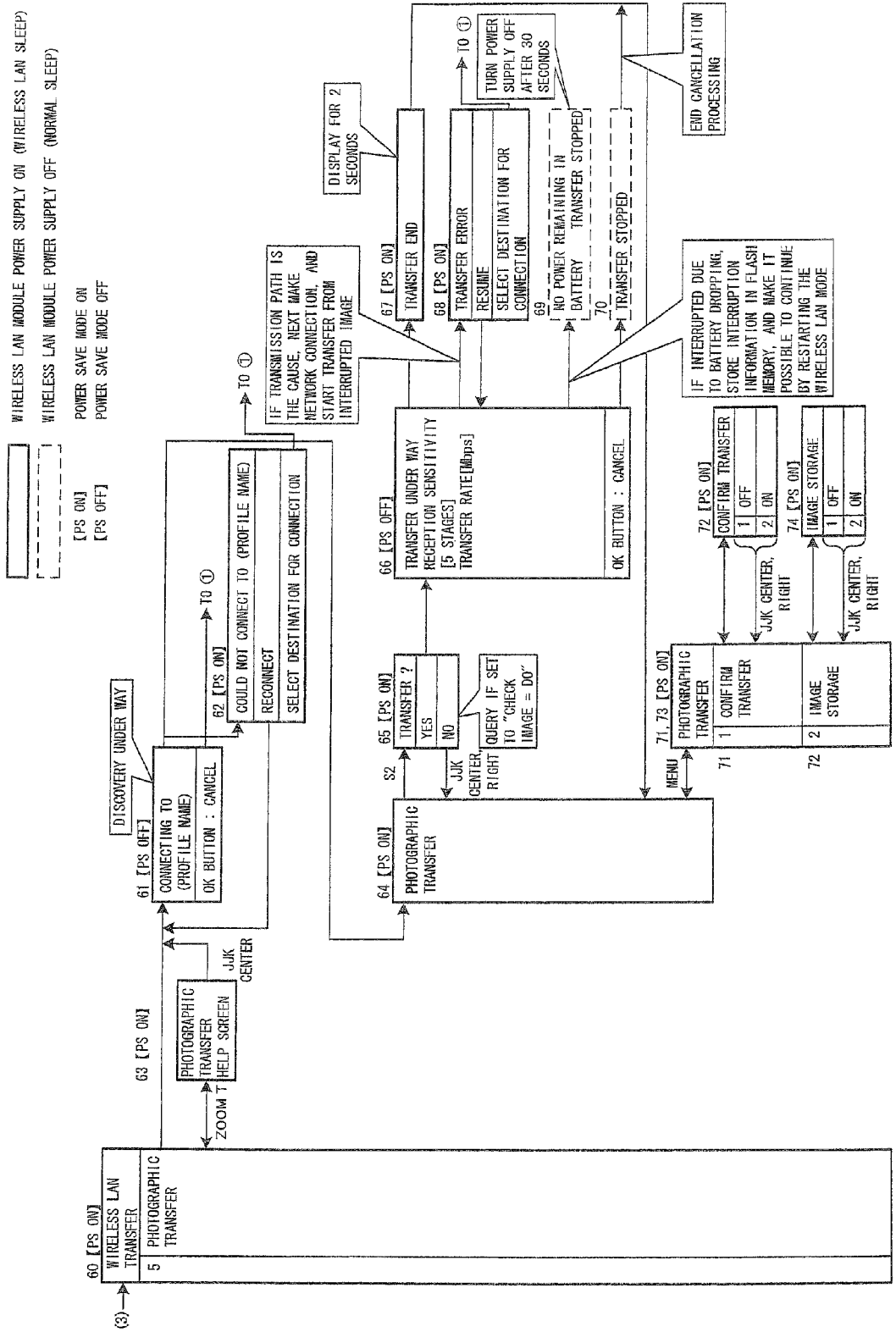
FIG. 18 is a menu transition figure when "photographic transfer" has been selected.

Menu transition figures for the electronic camera 1 in the wireless LAN mode are shown in FIGS. 13 through 18. FIG. 13 is a menu transition figure for from when change over to the wireless LAN mode is performed, until any one of the transfer methods for the image data is selected upon the wireless LAN menu screen. And FIGS. 14 through 18 are menu transition figures for after one of the transfer methods for the image data has been selected upon the wireless LAN menu screen. FIG. 14 is a menu transition figure for when "update transfer" has been selected; FIG. 15 is for "transfer by day of photography"; FIG. 16 is for "marked image transfer"; FIG. 17 is for "selected image transfer"; and FIG. 18 is for "photographic transfer". By operating according to these menu transition figures, the electronic camera 1 performs the various kinds of procedures described above.

It should be understood that, in the menu transition figures of FIGS. 13 through 18, there are shown the change over timing between the wireless LAN sleep mode and the normal sleep mode first explained, and the ON/OFF timing of the power save mode. The electronic camera 1 transits to the wireless LAN sleep mode in the menu item the frame of which is shown as a solid line, and transits to the normal sleep mode in the menu item the frame of which is shown as a broken line. Moreover, among the menu items shown with solid lines, the electronic camera 1 switches the power save mode to ON in the menu item above which "PS ON" is written, and switches the power save mode to OFF in the menu item above which "PS OFF" is written.

Figure 21:
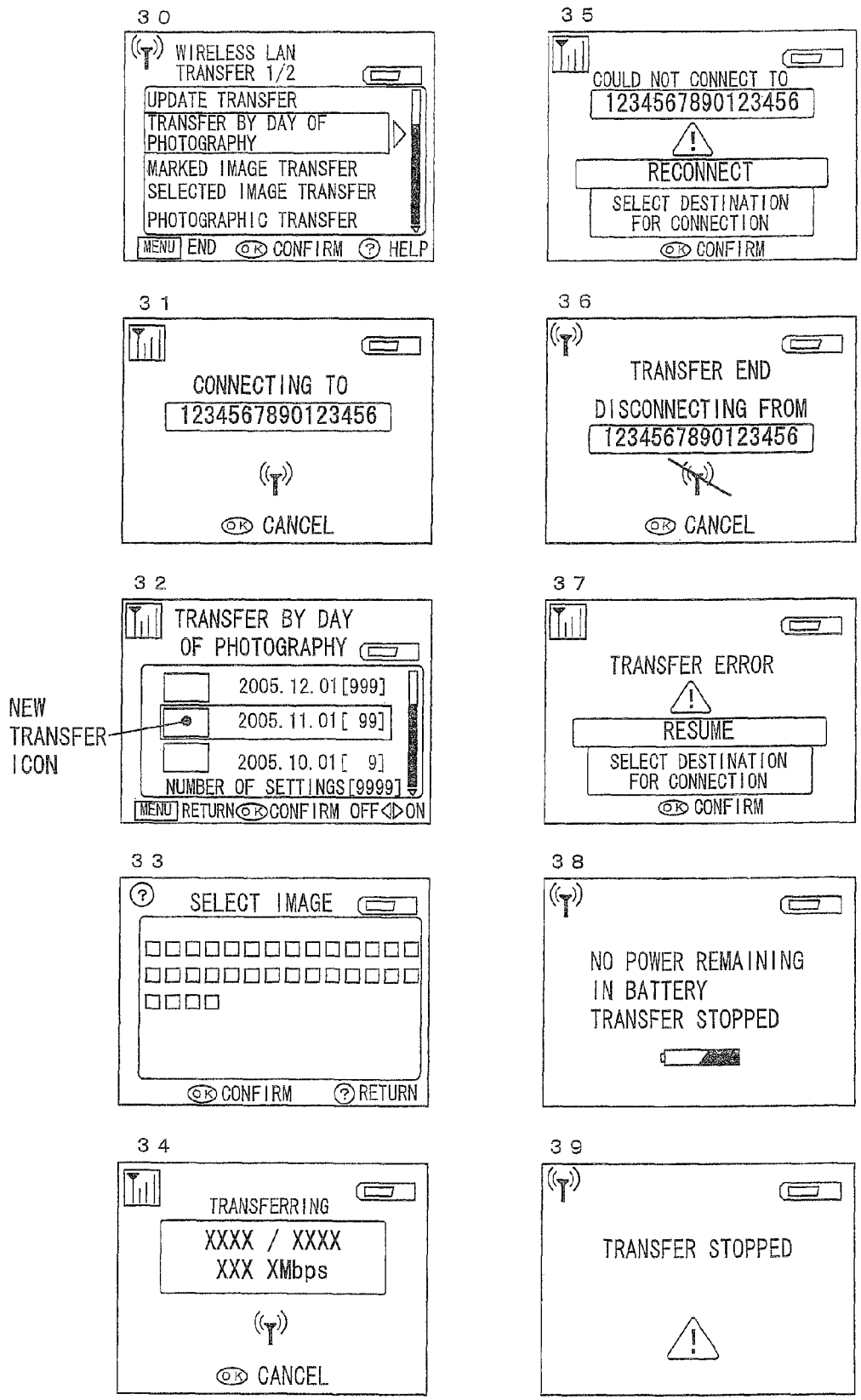
FIG. 21 is a figure showing an example of screens corresponding to the menu transition figure of FIG. 15.
Figure 23:
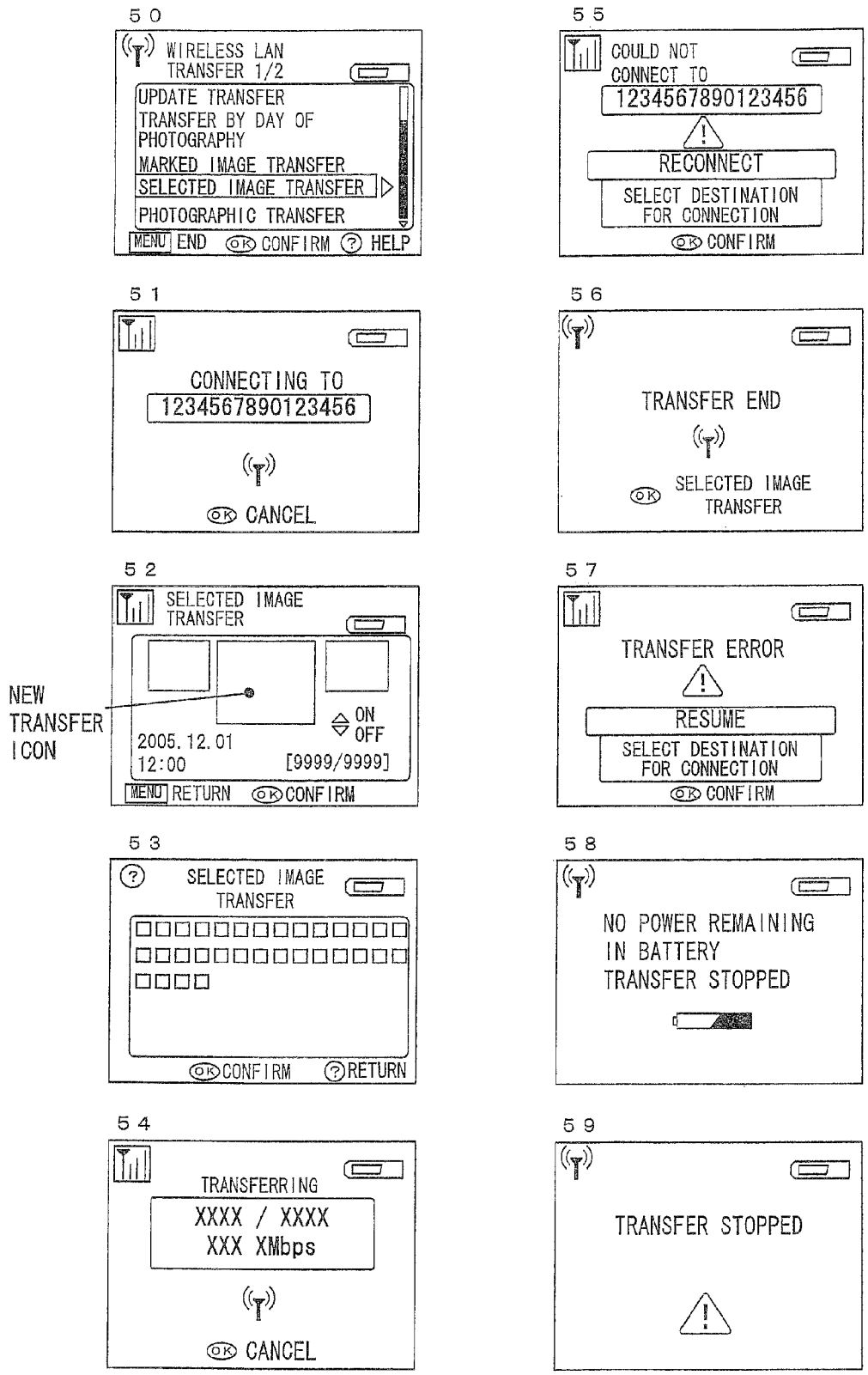
FIG. 23 is a figure showing an example of screens corresponding to the menu transition figure of FIG. 17.

FIGS. 19.1, 19.2, 20, 21, 22, 23, 24.1 and 24.2 show examples of screens displayed upon the liquid crystal display 21 when the electronic camera 1 operates according to the menu transition figures of FIGS. 13 through 18. FIGS. 19.1 and 19.2 are screen examples corresponding to the menu transition figure of FIG. 13. FIG. 20 is a screen example corresponding to the menu transition figure of FIG. 14. FIG. 21 is a screen example corresponding to the menu transition figure of FIG. 15. FIG. 22 is a screen example corresponding to the menu transition figure of FIG. 16. FIG. 23 is a screen example corresponding to the menu transition figure of FIG. 17. And FIGS. 24.1 and 24.2 are screen examples corresponding to the menu transition figure of FIG. 18.

The numbers written above each screen in the figures described above show their correspondence with the menu items on the menu transition figures of FIGS. 13 through 18. For example, the screen above which "1" is written in FIG. 19.1 shows an example of the menu item against which the same "1" is written in FIG. 13, in other words an example of the wireless LAN opening screen. It should be understood that, since the screen examples shown in the various figures described above are only examples, it would also be acceptable to provide a screen design that is different from this.

Among the various screens shown in the various figures described above, in the screen shown as #6 in FIG. 19.1, the received electric field strength of the wireless LAN radio waves that are detected by the wireless LAN module unit 24 is displayed as an antenna, in 5 stages. If it has not been possible to detect any wireless LAN radio waves, then "no-service area" is displayed. Moreover, during the transfer of the image data, the transfer rate that is calculated as previously described is displayed upon a screen, such as the screen shown as #22 in FIG. 20 or the like.

According to the embodiment explained above, the following beneficial operational effects are obtained.

(1) It is arranged to change over the power save mode to ON or OFF according to the operational state of the electronic camera 1. If the power save mode is changed over to ON, the operation of the wireless LAN module unit 24 is stopped when radio waves are not being transmitted, and if the power save mode is changed over to OFF, the wireless LAN module unit 24 operates in its standby state when radio waves are not being transmitted. By doing this, it is possible to keep down useless battery consumption during the transmission and reception of radio waves.

(2) It is arranged to change over the power save mode to ON when the wireless LAN menu screen is being displayed upon the liquid crystal display 21, or when the transfer of the corresponding captured image data has ended in a "transfer by day of photography" or "selected image transfer". By doing this, it is possible to change over the power save mode to ON when high throughput is not demanded.

(3) Furthermore, it is arranged to change over the power save mode to OFF when captured image data is being transferred, therefore, it is possible to change over the power save mode to OFF when high throughput is being demanded in order not to decrease the throughput.

(4) When supply of electrical power from the battery 4 to the wireless LAN module unit 24 is prohibited, if actuation input is not performed by the user for a predetermined time period, then the electronic camera 1 transits to the normal sleep mode, and the operation of the wireless LAN module unit 24 and the liquid crystal display 21 stops. Furthermore, when supply of electrical power from the battery 4 to the wireless LAN module unit 24 is permitted, if actuation input is not performed by the user for a predetermined time period, then the electronic camera 1 transits to the wireless LAN sleep mode, and the operation of the liquid crystal display 21 stops while the wireless LAN module unit 24 continues to be operated as before. By doing this, it is possible to implement a sleep function that does not exert any influence upon the communication by wireless LAN, thus keeping down useless battery consumption.

(5) After transition to the normal sleep mode, if actuation input is not performed by the user for a predetermined time period, then the auto power OFF function operates and the power supply to the electronic camera 1 is turned OFF so that its operation stops. By doing this, it is possible further to keep down useless battery consumption.

(6) After the transition to the wireless LAN sleep mode during a transfer of captured image data and completion of the transfer, if no actuation input is performed by the user for a predetermined time period, then the electronic camera 1 transits from the wireless LAN sleep mode to the normal sleep mode. By doing this, it is possible to further keep down useless battery consumption. Moreover, if subsequently the auto power OFF function operates and the power supply to the electronic camera 1 is cut OFF, then, when next the power supply to the electronic camera 1 is turned ON, a message is displayed upon the liquid crystal display 21 to indicate that the transfer of the captured image data has ended. By doing this, it is possible for the user to confirm that the transfer has been completed.

(7) In the battery check for detecting the remaining capacity of the battery 4, if the wireless LAN module unit 24 is not operating, then, when the voltage of the battery drops below the threshold value Vth1 that is determined in advance, it is decided that the remaining capacity in the battery is insufficient. And if the wireless LAN module unit 24 is operating, it is decided that the remaining capacity in the battery is insufficient, when the voltage of the battery drops below the threshold value Vth2 that is at least lower than the threshold value Vth1. By doing this, it is possible to avoid it being mistakenly and undesirably decided that the remaining battery capacity is insufficient, even though the battery voltage is decreased due to the transmission of radio waves upon the wireless LAN.

(8) The mode dial is set to the position "wireless LAN" so that the operational mode of the electronic camera 1 is changed over to the wireless LAN mode, the profile listing screen is displayed upon the liquid crystal display 21, and the supply of electrical power to the wireless LAN module unit 24 is prohibited until a destination for connection of the electronic camera 1 is selected upon this listing screen by the user. And the supply of electrical power to the wireless LAN module unit 24 is permitted when a destination for connection of the electronic camera 1 has been selected upon this profile listing screen by the user. By doing this, it is possible to keep down useless battery consumption.

(9) It is also possible not to receive actuation input by the user via the replay button, when the operation mode of the electronic camera 1 is changed over to the wireless LAN mode. By doing this it is possible to keep down useless battery consumption by yet a further level, since it is possible to avoid unnecessary transmission and reception of radio waves being performed by the wireless LAN module unit 24 during replay display of a captured image, and the battery power being consumed uselessly thereby.

(10) Furthermore, if it is arranged to prohibit the driving of the photographic lens when the operational mode of the electronic camera 1 is changed over to the wireless LAN mode, then, during operation in the wireless LAN mode, it is possible to prevent useless battery consumption due to driving of the photographic lens unnecessarily, so that it is possible further to keep down useless battery consumption.

The embodiment and various types of variant embodiment explained above are only examples, and the present invention is not limited by these details, provided that the distinguishing features of the invention are not lost. Other modes that are considered to be within the range of the technical concept of the present invention are also included within the scope of the present invention.

The contents of the disclosures of the following patent applications, upon which priority is claimed, are hereby incorporated by reference:
Japanese Patent Application 201,320 of 2005 (submitted on 11 Jul. 2005);
Japanese Patent Application 201,321 of 2005 (submitted on 11 Jul. 2005);
Japanese Patent Application 201,331 of 2005 (submitted on 11 Jul. 2005);
Japanese Patent Application 201,332 of 2005 (submitted on 11 Jul. 2005).

The invention claimed is:

1. An electronic camera that transfers captured image data to a computer or a printer to which the electronic camera is connected via wireless communication, the electronic camera comprising:
an image display unit that displays various types of image including a captured image;
a wireless communication unit that performs wireless communication with the computer or the printer;
an electrical power supply control unit that permits or prohibits supply of electrical power from a battery that supplies electrical power to the image display unit and the wireless communication unit, to the wireless communication unit;
an actuation unit for receiving actuation input of an user;
a first sleep control unit that, if actuation input by the user upon the actuation unit is not performed for at least a predetermined time period when supply of electrical power from the battery to the wireless communication unit is prohibited by the electrical power supply control unit, transits to a first sleep mode in which operation of the wireless communication unit and the image display unit being stopped; and
a second sleep control unit that, if actuation input by the user upon the actuation unit is not performed for at least a predetermined time period when supply of electrical power from the battery to the wireless communication unit is permitted by the electrical power supply control unit, transits to a second sleep mode in which operation of the image display unit being stopped while continuing the operation of the wireless communication unit.

2. An electronic camera according to claim 1, further comprising an auto power OFF control unit that turns the power supply to the electronic camera entirely OFF and stops operation thereof if actuation input by the user upon the actuation unit is not performed for at least a predetermined time period after transition to the first sleep mode.

3. An electronic camera according to claim 2, further comprising a sleep transition control unit that transits to the second sleep mode during transfer of captured image data, and, after this transfer of captured image data has terminated, transits from the second sleep mode to the first sleep mode if actuation input by the user upon the actuation unit is not performed for at least a predetermined time period.

4. An electronic camera according to claim 3, wherein, in case that the power supply to the electronic camera is turned OFF by the auto power OFF control unit after transition has taken place from the second sleep mode to the first sleep mode by the sleep transition control unit, when the power supply to the electronic camera is turned ON, it is displayed upon the image display unit that the transfer of captured image data terminated.

5. An electronic camera according to claim 1, further comprising a sleep transition control unit that transits to the second sleep mode during transfer of captured image data, and, after this transfer of captured image data has terminated, transits from the second sleep mode to the first sleep mode if actuation input by the user upon the actuation unit is not performed for at least a predetermined time period.

* * * * *